US008542928B2

(12) United States Patent
Kaneda et al.

(10) Patent No.: US 8,542,928 B2
(45) Date of Patent: Sep. 24, 2013

(54) INFORMATION PROCESSING APPARATUS AND CONTROL METHOD THEREFOR

(75) Inventors: Yuji Kaneda, Kawasaki (JP); Masakazu Matsugu, Yokohama (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1399 days.

(21) Appl. No.: 11/532,979

(22) Filed: Sep. 19, 2006

(65) Prior Publication Data

US 2007/0122036 A1 May 31, 2007

(30) Foreign Application Priority Data

Sep. 26, 2005 (JP) ................................. 2005-278782
Sep. 26, 2005 (JP) ................................. 2005-278783

(51) Int. Cl.
*G06K 9/46* (2006.01)
(52) U.S. Cl.
USPC ........... 382/190; 382/118; 382/100; 382/101; 382/103; 382/195
(58) Field of Classification Search
USPC ................ 382/190, 118, 108, 100, 101, 103, 382/195, 144, 155
See application file for complete search history.

(56) References Cited

U.S. PATENT DOCUMENTS

| | | | |
|---|---|---|---|
| 5,802,220 A * | 9/1998 | Black et al. | 382/276 |
| 5,933,527 A * | 8/1999 | Ishikawa | 382/190 |
| 6,463,163 B1 * | 10/2002 | Kresch | 382/103 |
| 6,879,709 B2 * | 4/2005 | Tian et al. | 382/118 |
| 7,224,823 B2 | 5/2007 | Hayata et al. | |
| 2004/0001616 A1 * | 1/2004 | Gutta et al. | 382/118 |
| 2006/0115157 A1 | 6/2006 | Mori et al. | |

FOREIGN PATENT DOCUMENTS

| | | |
|---|---|---|
| CN | 1484816 A | 3/2004 |
| JP | 09-282454 | 10/1997 |

(Continued)

OTHER PUBLICATIONS

M. Matsugu, K. Mori, M. Ishii, and Y. Mitarai, "Convolutional Spiking Neural Network Model for Robust Face Detection", 9th International Conference on Neural Information Processing, pp. 660-664, Nov. 2002.

(Continued)

*Primary Examiner* — Kim Vu
*Assistant Examiner* — Ruiping Li
(74) *Attorney, Agent, or Firm* — Cowan, Liebowitz & Latman, P.C.

(57) ABSTRACT

An information processing apparatus includes an image input unit which inputs image data containing a face, a face position detection unit which detects, from the image data, the position of a specific part of the face, and a facial expression recognition unit which detects a feature point of the face from the image data on the basis of the detected position of the specific part and determines facial expression of the face on the basis of the detected feature point. The feature point is detected at a detection accuracy higher than detection of the position of the specific part. Detection of the position of the specific part is robust to a variation in the detection target.

16 Claims, 43 Drawing Sheets

(56) References Cited

FOREIGN PATENT DOCUMENTS

| | | |
|---|---|---|
| JP | 11-250267 A | 9/1999 |
| JP | 2000-105829 A | 4/2000 |
| JP | 3452685 | 7/2003 |
| JP | 2004-062651 A | 2/2004 |
| JP | 2005-056387 A | 3/2005 |
| JP | 2005-056388 A | 3/2005 |
| KR | 10-2005-0007688 | 1/2005 |
| WO | WO 2005/008593 A1 | 1/2005 |

OTHER PUBLICATIONS

The above foreign reference was cited in a Mar. 27, 2009 Chinese Office Action that issued in Chinese Patent Application No. 200610152329.5, which is enclosed with English Translation.

The above references were cited in a Mar. 8, 2011 Japanese Office Action, which is enclosed without an English Translation, that issued in Japanese Patent Application No. 2005-278782.

The above references were cited in a Mar. 8, 2011 Japanese Office Action, which is enclosed without an English Translation, that issued in Japanese Patent Application No. 2005-278783.

* cited by examiner

F I G. 10
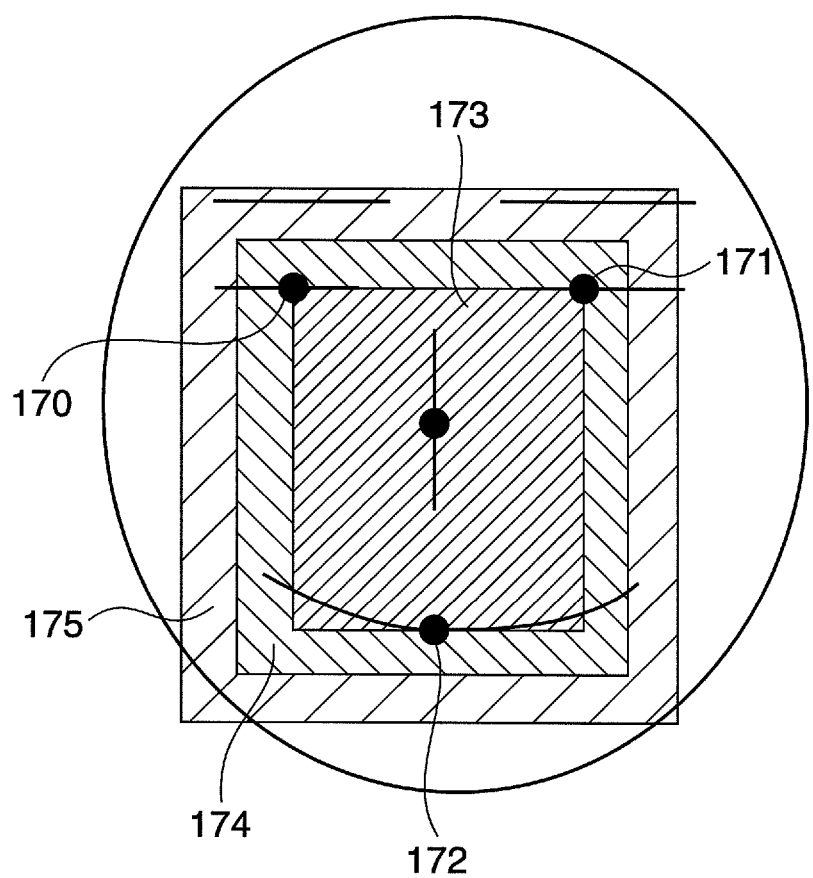

F I G. 11
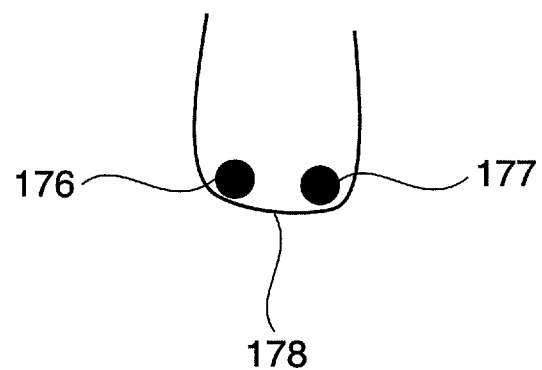

F I G. 12A
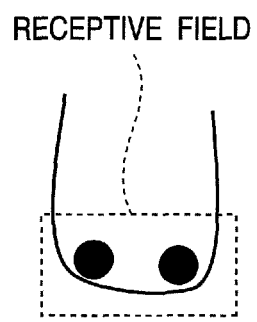

RECEPTIVE FIELD

F I G. 12C
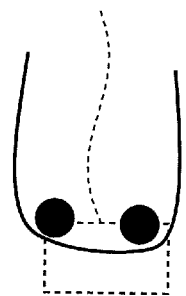
RECEPTIVE FIELD

F I G. 20
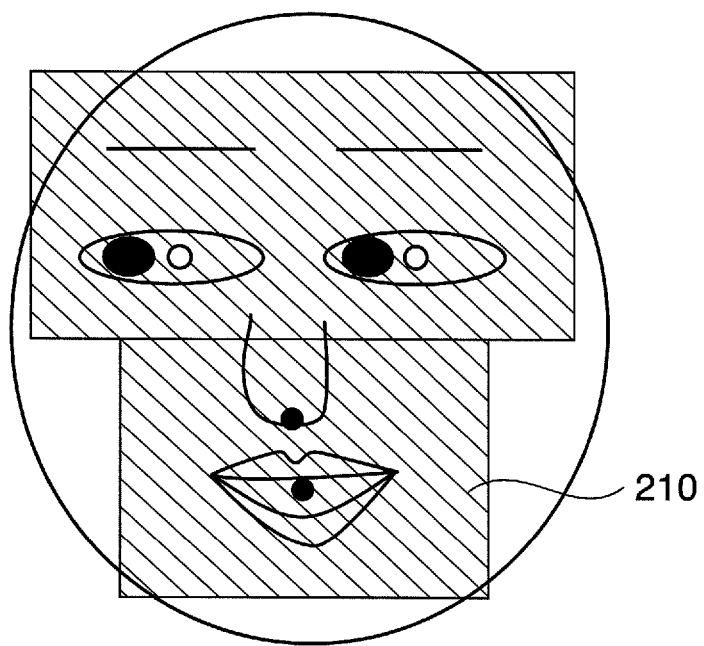

SIZE VARIATION

HORIZONTAL ROTATIONAL VARIATION

F I G. 24
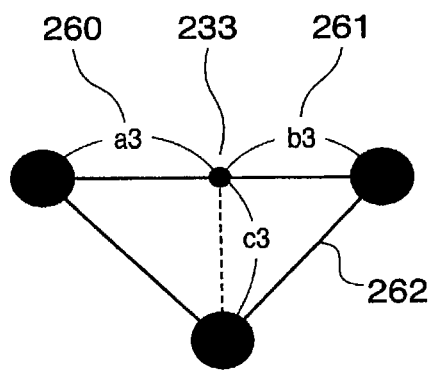
VARTICAL ROTATIONAL VARIATION

F I G. 26

| FEATURE AMOUNT | WEIGHT |
|---|---|
| DISTANCE BETWEEN EYE END AND MOUTH END | LARGE |
| DISTANCE BETWEEN MOUTH ENDS | LARGE |
| DISTANCE BETWEEN UPPER AND LOWER EDGES OF MOUTH REGION | MEDIUM |
| EDGE DENSITY OF CHEEK REGION | LARGE |
| EDGE DENSITY OF FOREHEAD AND GLABELLA REGION | SMALL |
| ⋮ | ⋮ | t [frame]　　　　　　　　　　t+1 [frame]

F I G. 34
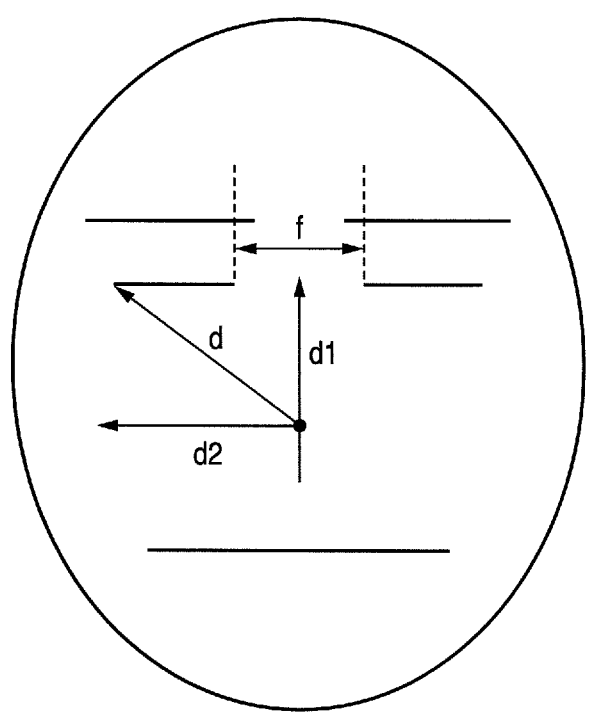

F I G. 40

| FACIAL EXPRESSION | DISTANCE BETWEEN EYE END AND MOUTH END | DISTANCE BETWEEN MOUTH ENDS | EDGE DENSITY OF CHEEK REGION | DISTANCE BETWEEN LATERAL AND MEDIAL CANTHI | ----- |
|---|---|---|---|---|---|
| JOY | 0.7 | 1.2 | 1.2 | 1.1 | ----- |
| ----- | ---- | ----- | ----- | ----- | ----- |

| FACIAL EXPRESSION | MOTION VECTOR 1 | | | | MOTION VECTOR 2 | | | |
|---|---|---|---|---|---|---|---|---|
| | PARAMETER 1 | PARAMETER 2 | ----- | ----- | PARAMETER 1 | PARAMETER 2 | ----- | ----- |
| JOY | INCREASE | DECREASE | ----- | ----- | INCREASE | INCREASE | ----- | ----- |
| ANGER | DECREASE | DECREASE | ----- | ----- | INCREASE | DECREASE | ----- | ----- |
| ----- | ----- | ----- | ----- | ----- | ----- | ----- | ----- | ----- |

313

INFORMATION PROCESSING APPARATUS AND CONTROL METHOD THEREFOR

BACKGROUND OF THE INVENTION

1. Field of the Invention

The present invention relates to an information processing apparatus and control method therefore, particularly to an image recognition technique.

2. Description of the Related Art

Conventionally, an object recognition (image recognition) technique is known, which causes an image sensing device to sense an object to acquire image data and calculates the position and orientation of the object by analyzing the image data.

Japanese Patent Laid-Open No. 09-282454 discloses the following object recognition technique. First, low-resolution object recognition processing is executed to coarsely obtain the position and orientation of a whole recognition target object (recognition processing of first phase). A local recognition range is set around a characteristic part on the object on the basis of the recognition result. High-resolution object recognition processing is partially executed for only the local recognition range (recognition processing of second phase). The characteristic part on the object includes, e.g., a hole for a screw or rod, a projection for assembly, and a mark on the object surface. The position and orientation of the entire target object are calculated on the basis of the object recognition result in the local recognition range.

However, the arrangement disclosed in Japanese Patent Laid-Open No. 09-282454 requires a predetermined time between the recognition processing of the first phase and the recognition processing of the second phase. For this reason, it is difficult to accurately recognize an object in an environment where the image sensing conditions dynamically change due to, e.g., variations in illumination conditions, variations in size and shape of the recognition target object, and rotation of the recognition target object.

Hence, if the recognition target object is a human face, and the facial expression at a given point of time should be recognized, the conventional technique mentioned above cannot be used.

On the other hand, there is another conventional technique which analyzes the image data of a sensed face image and recognizes the eye region of the recognition target in the sensed image on the basis of the analysis result.

Japanese Patent No. 3452685 discloses a face image processing technique. In this technique, only a low luminance value is extracted from a face image by using a filter to extract a low luminance value and binarized. The barycenter of the binary image is calculated. The barycentric position is set as the barycentric position of the face. An eye existence region is set on the basis of the barycentric position. At least one eye existence candidate region is set in the existence region. The candidate regions allow to determine the eye region.

The face image processing technique disclosed in Japanese Patent No. 3452685 is implemented to process an image which contains only a face. Hence, if a background is present in the image, the face barycentric position may be recognized as a position far from the true position. In this case, the eye region cannot be set correctly. When setting a region by the technique disclosed in Japanese Patent No. 3452685, the distance between the camera and the object is measured in advance, and the eye region is set on the basis of the measured distance, independent of the size of the face of the object. For this reason, correct region setting may be impossible for an arbitrary face size. Correct region setting may also be impossible when a variation such as rotation occurs.

SUMMARY OF THE INVENTION

The present invention has been made in consideration of the above-described problems, and has as its object to provide a technique of accurately recognizing an object even in an environment where image sensing conditions dynamically change. It is another object of the present invention to provide a technique of accurately recognizing a face under various image sensing conditions.

In order to achieve the above object, an information processing apparatus according to the present invention has the following arrangement. The information processing apparatus comprises:
   an input unit adapted to input image data containing a face;
   a first detection unit adapted to detect, from the image data, a position of a specific part of the face;
   a second detection unit adapted to detect a feature point of the face from the image data on the basis of the detected position of the specific part; and
   a determination unit adapted to determine facial expression of the face on the basis of the detected feature point,
   wherein the second detection unit has higher detection accuracy than detection accuracy of the first detection unit, and the first detection unit is robust to a variation in a detection target.

In order to achieve the above object, a control method for an information processing apparatus according to the present invention has the following arrangement. The control method for an information processing apparatus for processing image data containing a face, comprises steps of:
   inputting image data containing a face;
   detecting, from the image data, a position of a specific part of the face;
   detecting a feature point of the face from the image data on the basis of the detected position of the specific part; and
   determining facial expression of the face on the basis of the detected feature point,
   wherein the second detection step has higher detection accuracy than detection accuracy of the first detection step, and the first detection step is robust to a variation in a detection target.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a schematic view showing a nostril barycentric position calculation range to obtain a nostril position, a product-sum operation range necessary for obtaining a barycenter calculation range, and an input image range necessary for obtaining the barycenter calculation range;

FIG. 11 is a schematic view showing the left and right nostril positions and the subnasal edge;

FIGS. 12A, 12B, and 12C are schematic views showing receptive fields necessary for calculating the barycenter of the left and right nostril positions, the barycenter of the right nostril position, and the barycenter of the subnasal edge;

FIG. 20 is a view showing a minimum input image region necessary for obtaining all feature points;

FIG. 24 is a schematic view showing the barycentric positions of the left and right eye regions and face region when vertical rotational variation has occurred;

FIG. 26 is a table showing the weights of feature amount variations in calculating scores from the feature amount variations to determine facial expression "joy";

FIG. 34 is a view showing the intercanthal distance and the horizontal and vertical components of the vector that has the initial point at the face detection position and the end point at the right lateral canthus feature point;

FIG. 40 is a view showing the contents of a table 113; and

FIG. 41 is a view showing the contents of a table 313.

DESCRIPTION OF THE EMBODIMENTS

The embodiments of the present invention will now be described in detail in accordance with the accompanying drawings. Note that each element in the following embodiments is not intended to limit the scope of the invention, but is merely an example.

<<First Embodiment>>

[Hardware Configuration of Information Processing Apparatus]

Figure 39:
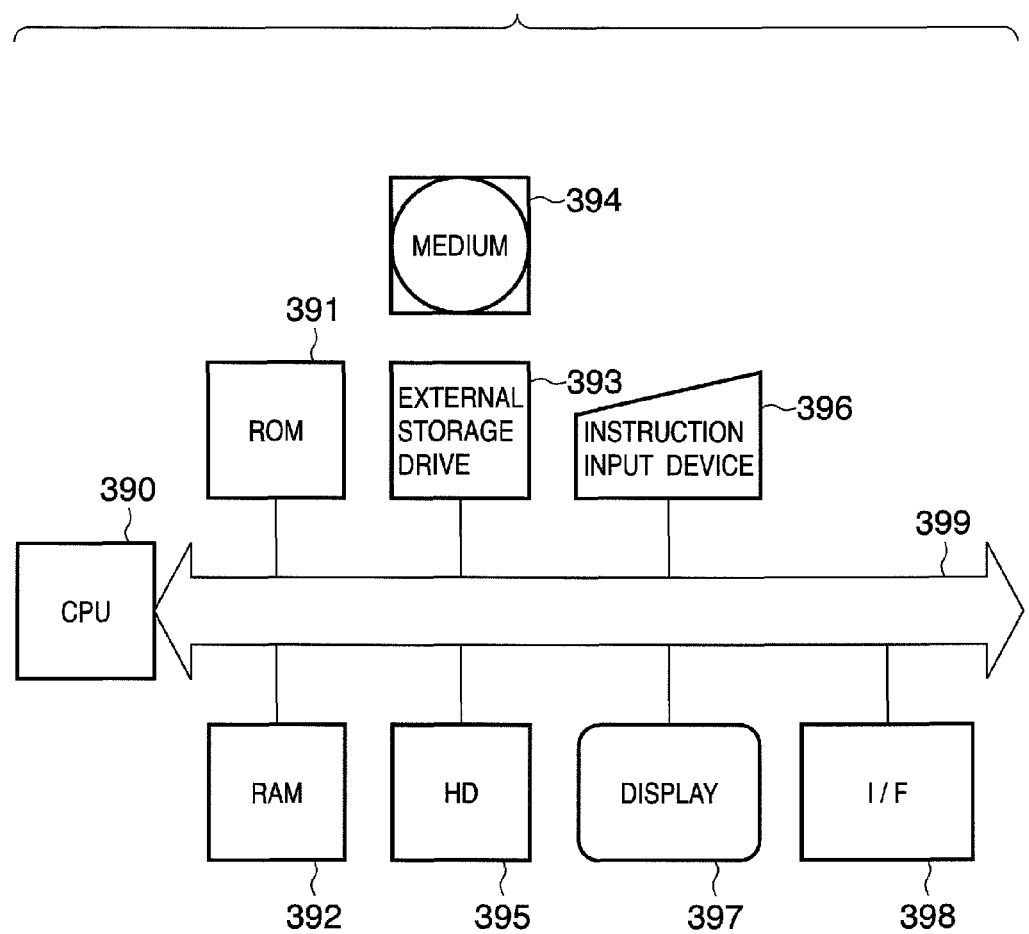
FIG. 39 is a block diagram schematically showing the hardware configuration of the information processing apparatuses according to the first to third embodiments.

The hardware configuration of an information processing apparatus according to this embodiment will be described first with reference to FIG. 39. FIG. 39 is a block diagram schematically showing the hardware configuration of the information processing apparatus of this embodiment. The information processing apparatus according to this embodiment is implemented by, e.g., a personal computer (PC), workstation (WS), or personal digital assistant (PDA).

Referring to FIG. 39, a CPU 390 executes application programs, operating system (OS), and control programs stored in a hard disk (to be referred to as an HD hereinafter) 395 (to be described later). The CPU 390 also controls to temporarily store, in a RAM 392, information and files necessary for program execution.

A ROM 391 stores programs including a basic I/O program and various kinds of data such as font data and template data used in document processing. The RAM 392 temporarily stores various kinds of data and functions as the main memory and work area of the CPU 390.

An external storage drive 393 that implements access to a recording medium can load, e.g., a program from a medium (recording medium) 394 to the computer system. The medium 394 may be an arbitrary medium such as a flexible disk (FD), CD-ROM, CD-R, CD-RW, PC card, DVD, IC memory card, MO, or memory stick.

In this embodiment, the external storage device 395 comprises an HD that functions as a mass storage device. The HD 395 stores application programs, OS, control programs, and related programs.

An instruction input device 396 is implemented by a device such as a keyboard, pointing device (e.g., mouse), and touch panel. The user inputs, to the information processing apparatus of this embodiment, e.g., a command to control it by using the instruction input device 396.

A display 397 displays a command input from the instruction input device 396 or a response output of the information processing apparatus to the command.

A system bus 399 manages the data flow in the information processing apparatus.

An image sensing device 398 senses an object and acquires image data. The image sensing device 398 comprises components such as an imaging optical system, solid-state image sensing element, and video signal processing circuit to execute A/D conversion and the like. The image sensing device 398 acquires digital image data by A/D-converting an electrical signal obtained from a CCD or CMOS sensor serving as a solid-state image sensing element. The image data acquired by the image sensing device 398 is subjected to buffering processing under the control of the CPU 390 and transferred to a memory such as the RAM 392 by DMA.

Software that implements the same functions as the above-described hardware devices may be used instead.

In an example of this embodiment, programs and related data according to the embodiment are directly loaded from the medium 394 to the RAM 392 and executed. The programs of this embodiment may be installed in the HD 395 in advance and loaded from there to the RAM 392 every time the programs of this embodiment run. Alternatively, the programs of this embodiment may be recorded in the ROM 391 as part of the memory map and directly executed by the CPU 390.

The information processing apparatus of this embodiment is implemented by a single apparatus for the descriptive convenience. However, the resources may be distributed to a plurality of apparatuses. For example, the storage and operation resources may be distributed to a plurality of apparatuses. The resources may be distributed to virtual constituent elements on the information processing apparatus to perform parallel processing.

[Functional Arrangement of Information Processing Apparatus]

Figure 1:
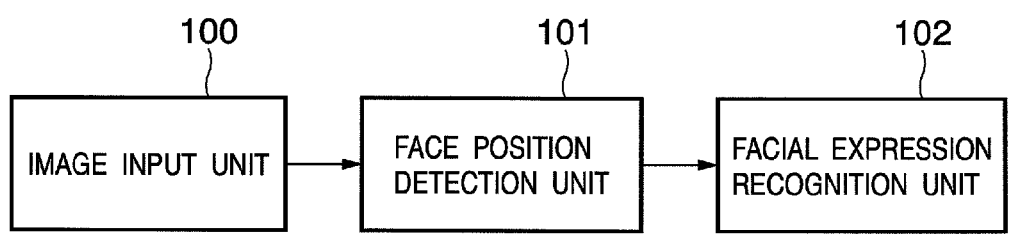
FIG. 1 is a block diagram showing the functional arrangement of an information processing apparatus according to the first embodiment.

The functional arrangement for object recognition by the above-described information processing apparatus will be described next with reference to FIG. 1. FIG. 1 is a block diagram showing the functional arrangement of the information processing apparatus according to this embodiment.

Functional blocks shown in FIG. 1 are implemented as the CPU 390 of the information processing apparatus that is described above with reference to FIG. 39 executes programs loaded to the RAM 392 and cooperates with each hardware shown in FIG. 1. Some or all of the functional blocks may be implemented by dedicated hardware.

Referring to FIG. 1, an image input unit 100 senses an object and acquires image data. The image input unit 100 corresponds to the image sensing device 398 in FIG. 39. The image input unit 100 acquires image data and buffers it in a memory such as the RAM 392.

In this embodiment, image data input by the image input unit 100 is data of a face image. In this embodiment, image data is data of a moving image containing a plurality of frames.

Figure 2:
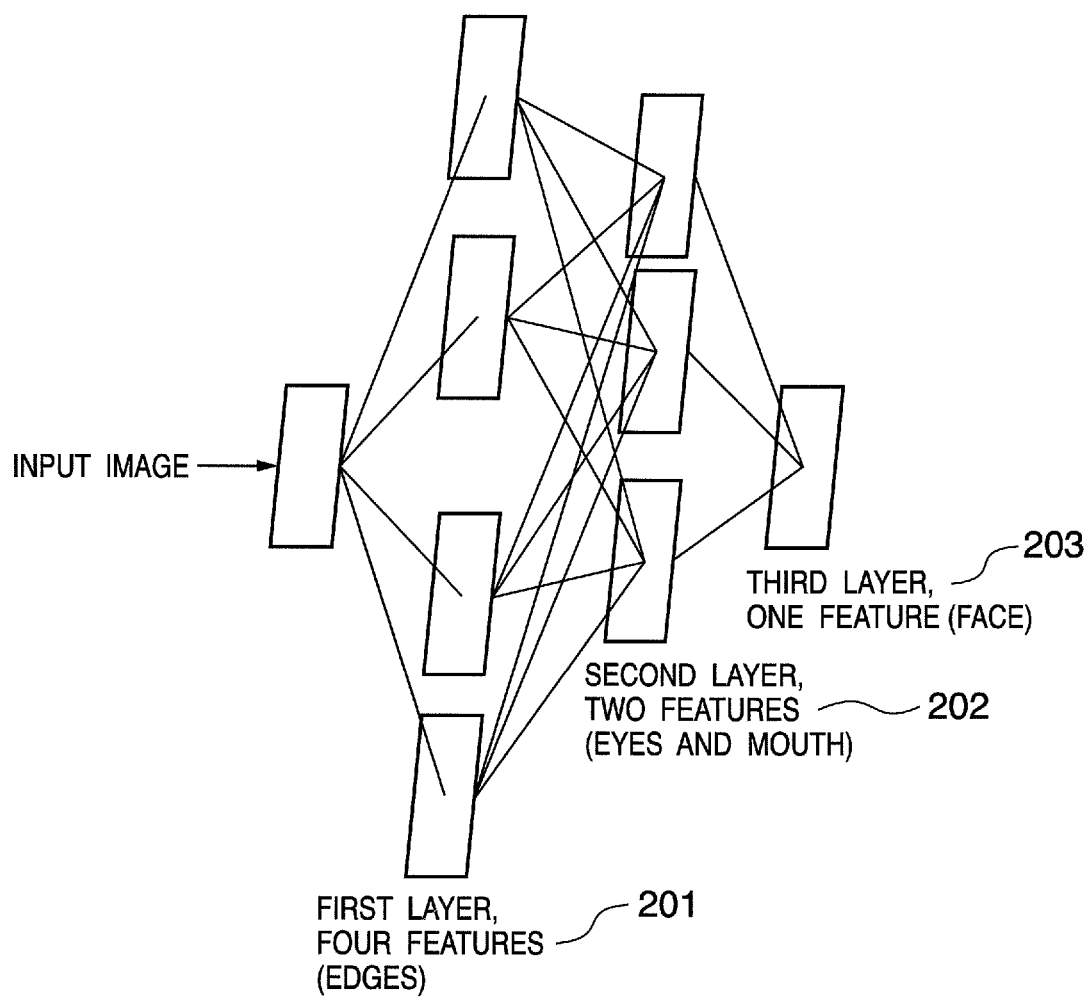
FIG. 2 is a schematic view showing a neural network.

A face position detection unit 101 specifies the position of a face, i.e., an object as a position and orientation calculation target. The face position detection unit 101 specifies the face position by using a multilayered neural network (first CNN) that is schematically shown in FIG. 2. FIG. 2 is a schematic view of the neural network.

In this embodiment, a face position in a digital image is specified particularly by using a convolutional neural network (to be referred to as a CNN hereinafter) as a neural network. The CNN is a known technique disclosed in, e.g., M. Matsugu, K. Mori, M. Ishii, and Y. Mitarai, "Convolutional Spiking Neural Network Model for Robust Face Detection", 9th International Conference on Neural Information Processing, pp. 660-664, November 2002. The CNN is implemented by cooperation of hardware and programs in the information processing apparatus of this embodiment. The operation of the face position detection unit 101 will be described later in detail.

Figure 6:
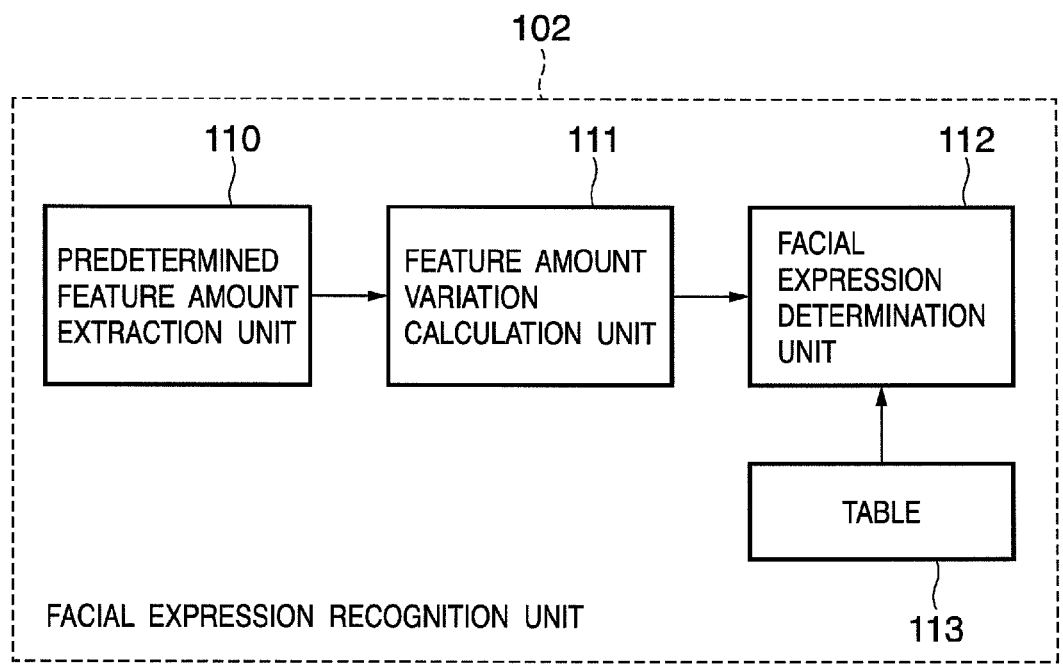
FIG. 6 is a block diagram showing the detailed functional arrangement of a facial expression recognition unit.

A facial expression recognition unit 102 has an arrangement shown in FIG. 6. FIG. 6 is a block diagram showing the detailed functional arrangement of the facial expression recognition unit 102. As shown in FIG. 6, the facial expression recognition unit 102 comprises a predetermined feature amount extraction unit 110, feature amount variation calculation unit 111, and facial expression determination unit 112. The facial expression determination unit 112 causes neurons to learn facial expression determination by looking up a table 113 containing the correspondence between feature amounts and facial expressions.

The arrangement of this embodiment uses two networks: a CNN (first CNN) to make the face position detection unit 101 detect a face position on the basis of an image and a CNN (second CNN) to make the facial expression recognition unit 102 obtain feature points necessary for recognizing facial expression.

The predetermined feature amount extraction unit 110 extracts predetermined feature amounts necessary for recognizing facial expression on the basis of an image sensing target's face position detected by the face position detection unit 101. The feature amount variation calculation unit 111 normalizes feature amount variations in accordance with variations in the feature amounts extracted by the predetermined feature amount extraction unit 110. In this normalization, the positions of feature points are corrected on the basis of their layout in image data. The facial expression determination unit 112 determines the facial expression on the basis of the feature amount variations normalized by the feature amount variation calculation unit 111. The predetermined feature amount extraction unit 110, feature amount variation calculation unit 111, and facial expression determination unit 112 included in the facial expression recognition unit 102 will be described later in detail.

[Overall Processing]

Figure 29:
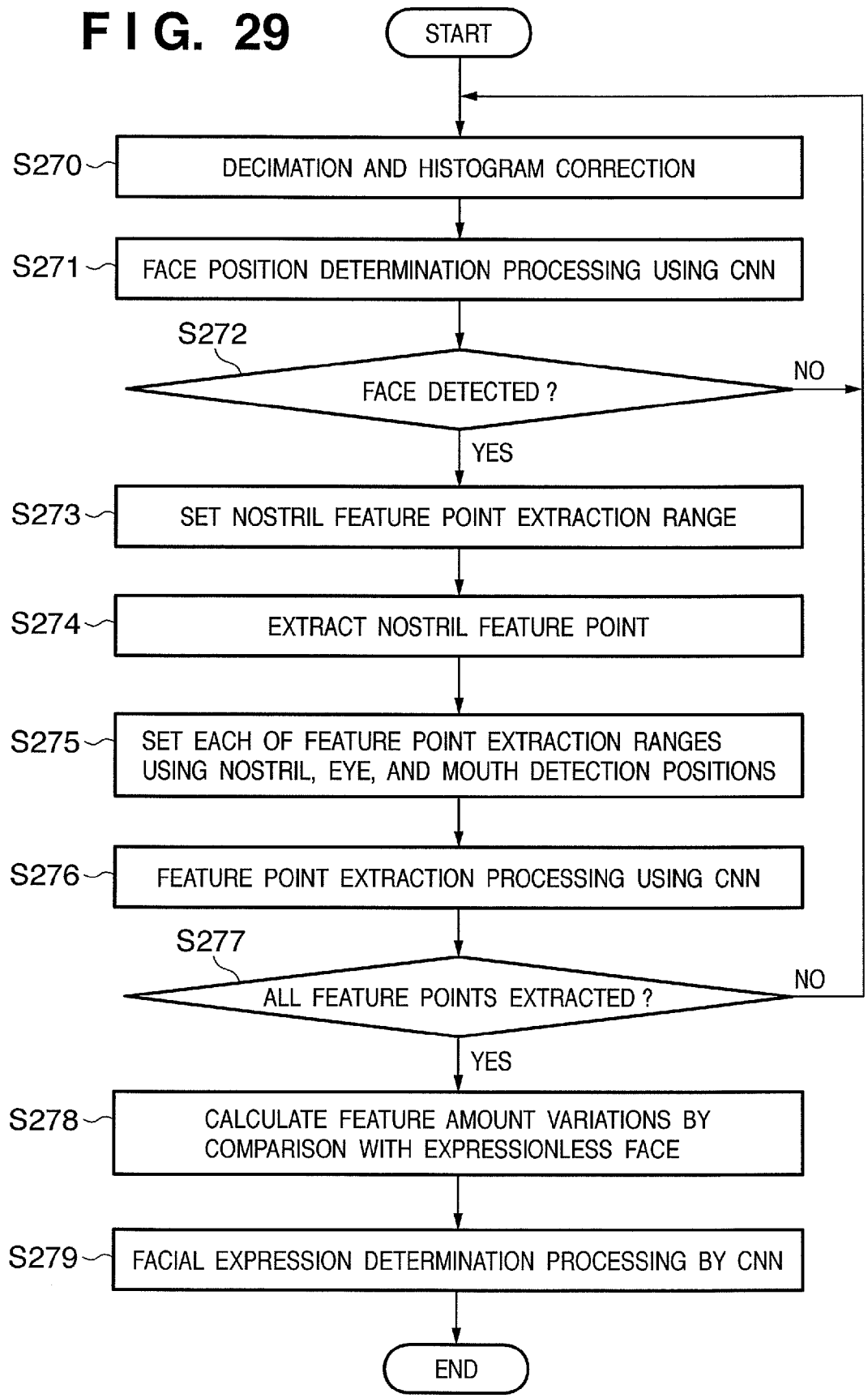
FIG. 29 is a flowchart showing the procedure of overall processing according to the first embodiment.

Overall processing executed by the arrangement of this embodiment will be described next with reference to FIG. 29. FIG. 29 is a flowchart showing the procedure of overall processing according to this embodiment.

In step S270, the face position detection unit 101 executes decimation and histogram correction of image data acquired by the image input unit 100. The image resolution after decimation is, e.g., 360×240 [pixels].

In step S271, the face position detection unit 101 determines a face position in the image by using the CNN. The resolution of the input image to the CNN to determine a face position is further reduced to, e.g., 180×120 [pixels] by decimation.

In step S272, the facial expression recognition unit 102 determines whether a face is detected. If a face is detected (YES in step S272), the process advances to step S273. If no face is detected (NO in step S272), the process returns to step S270 to execute the same processing for the image data of the next frame.

In step S273, the predetermined feature amount extraction unit 110 sets a nostril feature point extraction range by using face and eye positions extracted by the first CNN for face position detection.

In step S274, the predetermined feature amount extraction unit 110 extracts a nostril feature point on the basis of the extraction range set in step S273.

In step S275, the predetermined feature amount extraction unit 110 sets feature point extraction ranges except the nostril feature point by using eye and mouth positions acquired using the CNN to determine the face position and the nostril feature point position extracted in step S274.

In step S276, the predetermined feature amount extraction unit 110 extracts feature points by using the second CNN on the basis of the extraction ranges set in step S275. The resolution of the input image to the second CNN to extract feature points is, e.g., 360×240 [pixels].

In step S277, the predetermined feature amount extraction unit 110 determines whether all feature points are extracted by the processing in steps S273 to S276. If all feature points are extracted (YES in step S277), the process advances to step S278. If not all feature points are extracted (NO in step S277), the process returns to step S270 to execute the same processing for the next frame.

In step S278, the feature amount variation calculation unit 111 calculates feature amount variations by comparison with an expressionless reference face prepared in advance and normalizes them in accordance with variations. That is, the positions of the feature points are corrected on the basis of their layout in the image data. The data of the expressionless reference face is stored in a storage device such as the HD 395 in advance.

In step S279, the facial expression determination unit 112 determines facial expression by using an NN for facial expression determination. Note that the NN indicates a neural network.

Processing in each step will be described below in detail by explaining processing in each functional arrangement.

[Face Position Detection Unit 101]

The function of the face position detection unit 101 will be described in detail. The face position detection unit 101 detects the position (face position) of a specific part of a face in image data on the basis of the outline of the face.

The face position detection unit 101 acquires image data stored in the buffer by the image input unit 100 and performs, as preprocessing, resolution change by decimation and histogram correction to reduce the influence of illumination conditions. The face position detection unit 101 inputs the corrected image data to the CNN.

As described above, image data acquired by the image input unit 100 is temporarily stored in the buffer. The face position detection unit 101 reads out the image data from the buffer every other pixel by decimation. For example, if the resolution of the buffered image data is 720×480 [pixels], the face position detection unit 101 acquires image data with a resolution of 360×240 [pixels] by decimation.

Figure 3:
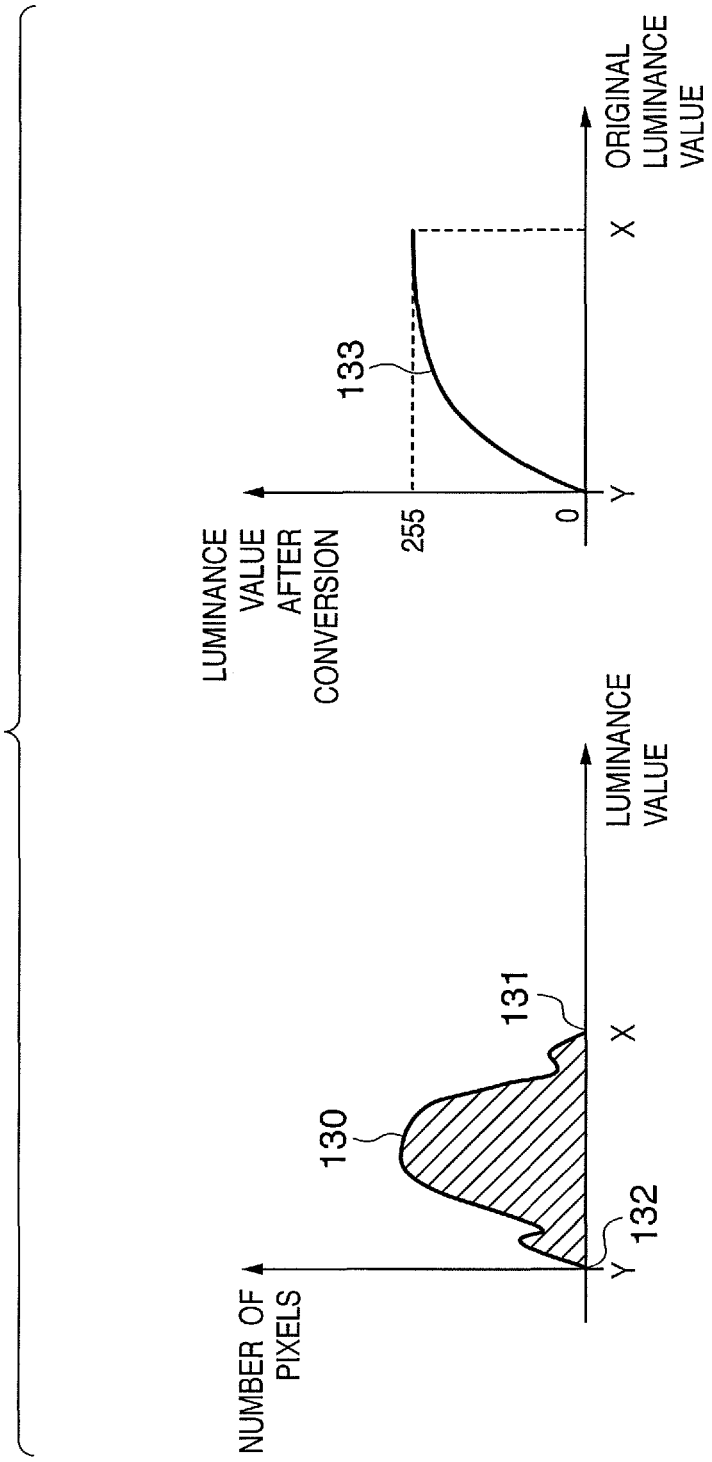
FIG. 3 is a view schematically showing histogram correction processing.

Next, histogram correction to be described below is executed. A luminance value histogram 130 of the input image is created, as shown in FIG. 3. FIG. 3 is a view schematically showing histogram correction. The luminance value histogram 130 indicates the distribution of the luminance values of the pixels of the input image (image data). The abscissa represents the luminance value, and the ordinate represents the number of pixels (degree).

Luminance values X 131 and Y 132 (maximum and minimum luminance values) at the ends of the curve are extracted from the luminance value histogram. The luminance values are converted by using a nonlinear function 133 such that the extracted luminance values 131 and 132 at the ends of the curve are, e.g., 255 and 0, respectively. A function that reduces an influence of illumination conditions such as shade, i.e., enhances the tone of a low-luminance region is selected and set in the information processing apparatus in advance as the nonlinear function.

When the luminance is corrected to enhance the tone of the low-luminance region in the above-described way, image recognition can accurately be done independently of the image sensing conditions.

Histogram correction may be done by any other method. For example, upper and lower limit luminance values are set in advance. Pixels with luminance values smaller than the lower limit value are converted into a luminance value "0". Pixels with luminance values equal to or larger than the upper limit value are converted into a luminance value "255". Pixels with luminance values between the lower and upper limit values are appropriately converted on the basis of the pixels having luminance values equal to or smaller than the lower limit value or pixels having luminance values equal to or larger than the upper limit value. This conversion method can also be applied.

Figure 4:
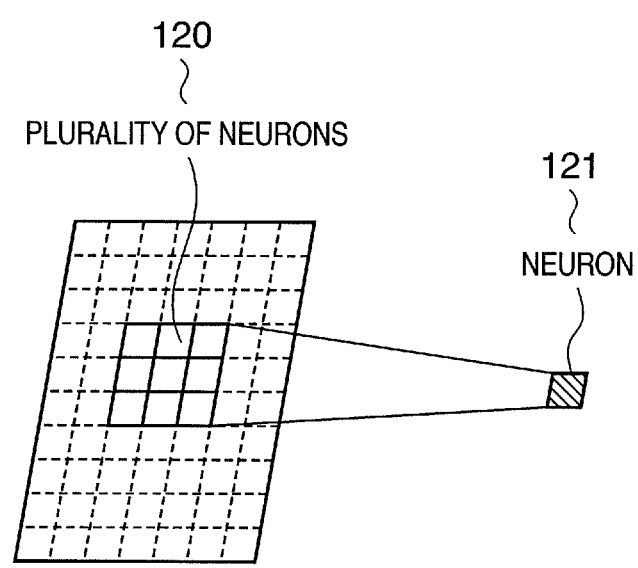
FIG. 4 is a view showing the connection relationship between a neuron of a given layer feature and a plurality of neurons of the preceding layer feature.

Each layer feature of the CNN includes a number of neurons. In this embodiment, one neuron output represents the feature detection result of one pixel of image data. For example, consider a case wherein only one preceding layer feature is connected to a given layer feature (the sub-sampling layer or feature pooling layer of the CNN). In this case, the internal state value of one neuron 121 of a layer can be obtained by the product-sum operation of a plurality of neurons 120 of the preceding layer feature and weighting factor data corresponding to them, as shown in FIG. 4. FIG. 4 is a view showing the connection relationship between a neuron of a given layer feature and a plurality of neurons of the preceding layer feature.

Figure 5:
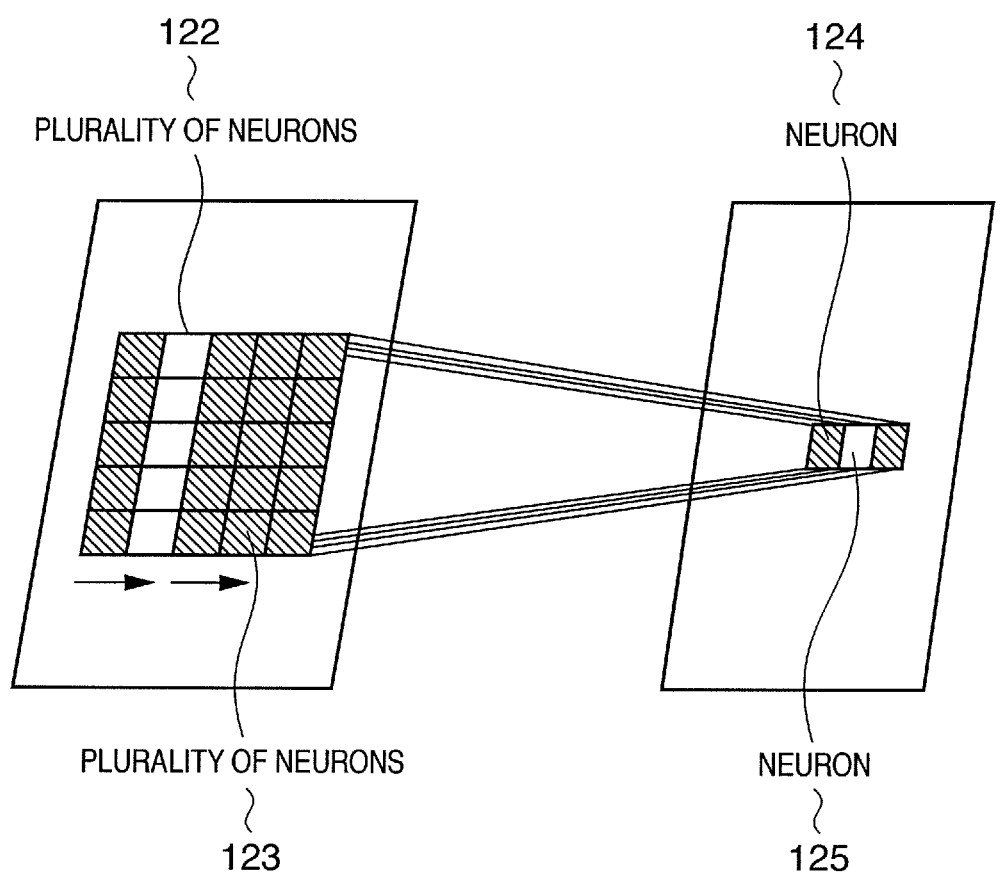
FIG. 5 is a view showing the connection relationship to preceding layer neurons necessary for calculating adjacent neurons of a given layer feature.

The number of neurons of the preceding layer to which one neuron is connected changes depending on the receptive field size of each feature that is decided to extract a specific feature. For example, if the receptive field size necessary for obtaining a certain feature is 3×5, an internal state value 124 of one neuron is calculated by the product-sum operation of 3×5 neuron values 122 and 3×5 weighting factors in the preceding layer, as shown in FIG. 5. FIG. 5 is a view showing the connection relationship to preceding layer neurons necessary for calculating adjacent neurons of a given layer feature.

A neuron value 125 immediately adjacent to the neuron internal state value 124 can be calculated by the product-sum operation of weighting factors and a plurality of neurons 123 of a region that is shifted from the plurality of neurons 122 by one pixel in the preceding layer. That is, a convolutional operation is executed by vertically and horizontally shifting by one pixel a region called a receptive field in the preceding layer and repeating the product-sum operation of a weighting factor data set and a plurality of neuron values located in each receptive field. With this processing, the internal state values of all neurons in the current layer can be obtained. If a plurality of preceding layer features are connected to a given layer feature (the feature detection layers of the CNN), as shown in FIG. 2, the sum of internal state values obtained in the connected preceding layer features is equivalent to the internal state value of one neuron.

The weighting factor data is obtained by learning using supervisory data given in advance. CNNs (layer features) having various characteristics can be created in accordance with supervisory data. For example, when learning is done by giving various variations such as illumination variation, size variation, and rotational variation to the supervisory data group of the CNN to detect a face position, the position detection accuracy degrades as compared to a case wherein learning is done by giving only a specific variation such as only illumination variation. Instead, a face detection CNN (layer feature) robust to these variations can be created. Alternatively, a layer feature capable of accurately detecting, e.g., only a V-shaped eye end position can be created by giving only data of V-shaped eye end points as supervisory data group.

Each layer of the CNN according to this embodiment will be described. The resolution of the input image to the input layer shown in FIG. 2, i.e., image data input to the CNN that specifies a face position in image data is lowered to 180×120 [pixels] by decimation to reduce the processing load.

The CNN of this embodiment has three layers, as shown in FIG. 2. The first layer level (first layer 201) extracts a total of four features: oblique (diagonal-right-up and diagonal-right-down) edges, horizontal edge, and vertical edge to recognize the outline of a face. The second layer level (second layer 202) extracts eye and mouth position features.

Figure 9:
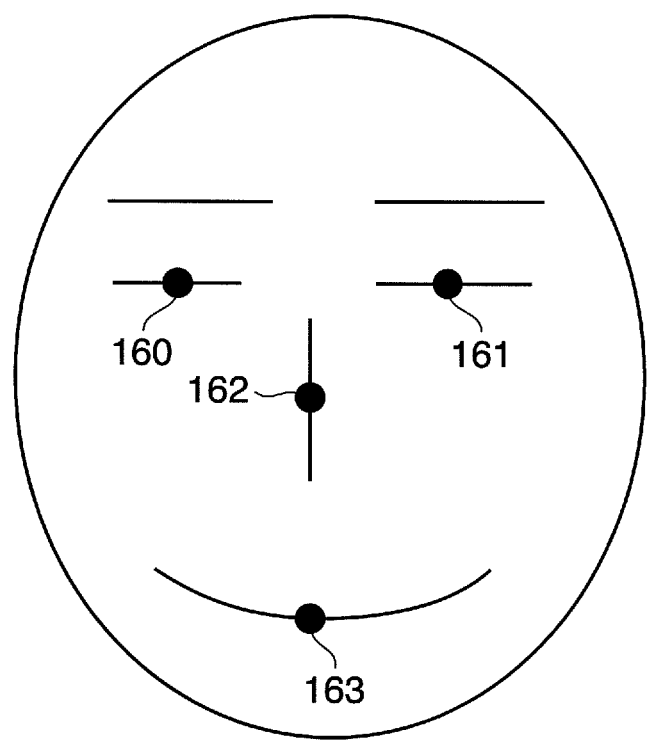
FIG. 9 is a schematic view showing face, left/right eye, and mouth barycentric positions obtained from the CNN to detect a face position.

The third layer level (third layer 203) extracts a face position. The face position includes specific parts defined in advance in a face image, i.e., eye region barycentric positions 160 and 161, mouth region barycentric position 163, face region barycentric position 162, and nostril position (to be described later), as shown in FIG. 9. FIG. 9 is a schematic view showing face, left/right eye, and mouth barycentric positions obtained from the CNN to detect a face position.

That is, the network arrangement of the CNN according to this embodiment extracts medium-order feature (eyes and mouth) positions by combining a plurality of lower-order feature (edge level) detection results and then extracts a higher-order feature (face position) position from the medium-order feature (eyes and mouth) detection results.

As described above, these features are detected because weighting factors that are learned by using supervisory data in advance axe used. Supervisory data used for learning in the CNN to detect a face is generated on the basis of image data of various variations such as size variation, rotational variation, illumination variation, and shape variation. Hence, a robust network capable of detecting face, eye, and mouth positions even in case of the plurality of variations is built.

Image data learning can be done for, e.g., a single object (face) on the basis of images obtained in a changing environment under the following conditions.

(1) The size varies up to three times.

(2) Rotational variation occurs within 45° in the vertical, horizontal, and depth directions.

(3) Rotational variation in plane occurs within 45° in the horizontal direction.

(4) Illumination conditions vary in image sensing under indoor and outdoor illumination environments.

(5) The shapes of eyes and mouth vary in the vertical and horizontal directions.

The network can be designed to learn such that the peripheral regions of the barycenters of the eyes, mouth, and face are regarded as their correct solution positions. That is, the correct solution positions of the eye, mouth, and face can be obtained by executing threshold processing of the product-sum operation results of the eye, mouth, and face detection positions and calculating the barycentric positions of local regions equal to or more than the threshold value. The positions of the eyes and mouth are decided only when the face position is decided. That is, in the product-sum operation and threshold processing to detect the eye and mouth positions, candidates for the eye and mouth positions are detected. Only when the face position is decided by the product-sum operation and threshold processing to decide the face position, the eye and mouth positions are decided.

The number of layers, the number of features, and the connection relationship between features of the CNN may be changed. Another method using, e.g., the maximum neuron value except threshold processing and barycenter calculation may calculate position information based on the neuron values of eyes, mouth, and face features. The resolution of image data obtained from the image input unit is not limited to 720×480 [pixels]. The resolution of the input image to the CNN to detect a face position is not limited to 180×120 [pixels], either.

[Predetermined Feature Amount Extraction Unit 110]

The predetermined feature amount extraction unit 110 included in the facial expression recognition unit 102 will be described next. The predetermined feature amount extraction unit 110 sets a region in image data on the basis of the face position detected by the face position detection unit 101, as will be described later in detail. The predetermined feature amount extraction unit 110 searches for face feature points in the set region and then determines facial expression on the basis of the found feature points.

Figure 7:
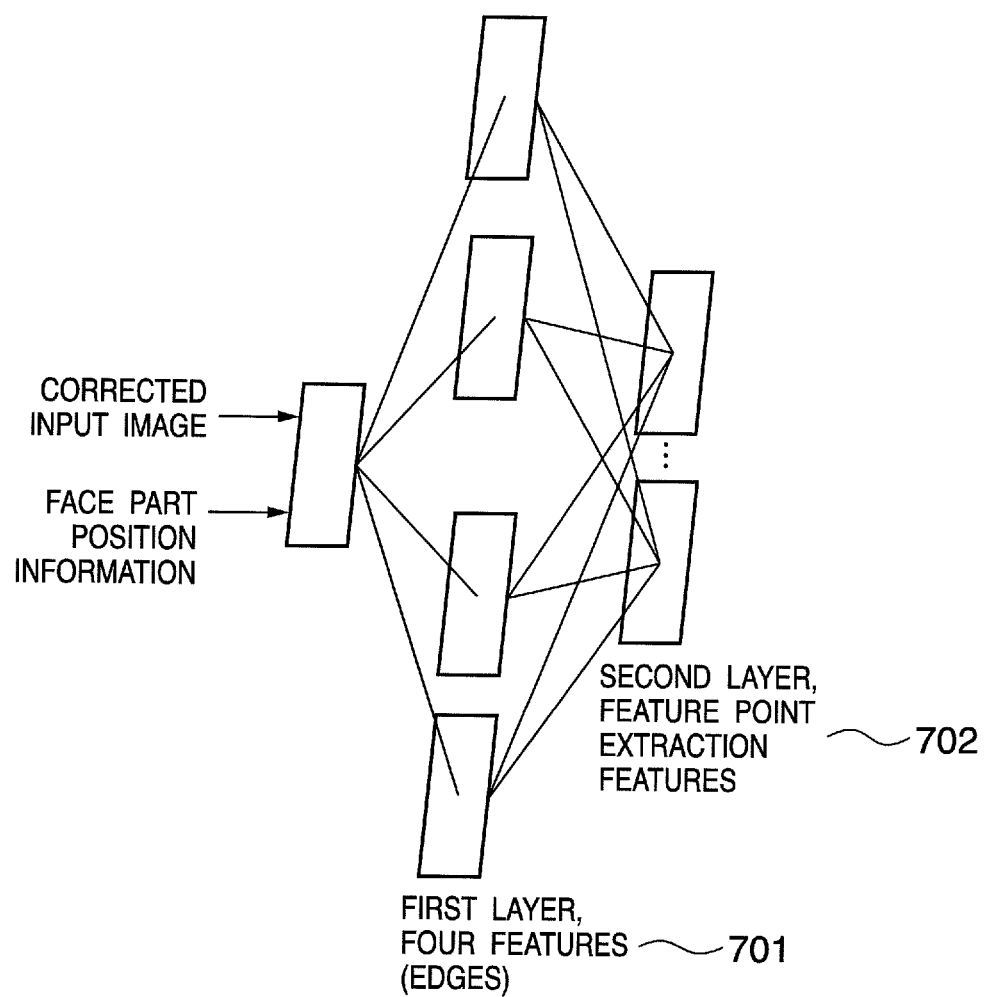
FIG. 7 is a view showing the arrangement of a CNN to extract feature points.

As described above, the arrangement of this embodiment uses two networks: a CNN (first CNN) to make the face position detection unit 101 detect a face position on the basis of an image and a CNN (second CNN) to make the facial expression recognition unit 102 obtain feature points necessary for recognizing facial expression. The predetermined feature amount extraction unit 110 causes the second CNN to extract feature points necessary for facial expression recognition on the basis of the input image and the eye, mouth, and face detection positions obtained by the face position detection unit 101. The second CNN to extract feature points necessary for facial expression recognition has an arrangement shown in FIG. 7. FIG. 7 is a view showing the arrangement of the CNN to extract feature points.

The input image to the second CNN to extract feature points is the histogram-corrected image obtained by preprocessing of the first CNN that specifies the face position. The image resolution is 360×240 [pixels]. The second CNN to extract feature points processes an input image with a high resolution of 360×240 [pixels] without decimation, unlike the first CNN to detect a face position. This is because feature points existing in small regions in the image region must be extracted accurately. The input image resolution of the second CNN to extract feature points is not limited to 360×240 [pixels].

Figure 8:
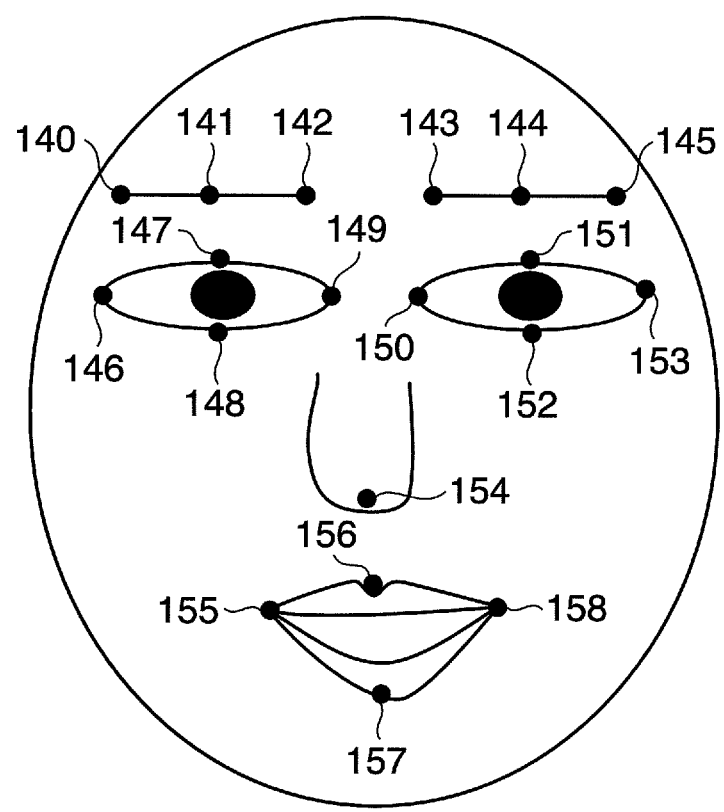
FIG. 8 is a schematic view showing feature points to be extracted.

The second CNN to extract feature points has two layer levels (701 and 702), as shown in FIG. 7. The first layer level 701 extracts a total of four features: oblique (diagonal-right-up and diagonal-right-down) edges, horizontal edge, and vertical edge. To extract feature points (left and right eyebrow feature points 140 to 145, left and right eye feature points 146 to 153, nostril feature point 154, and mouth feature points 155 to 158) necessary for facial expression recognition, the second layer level 702 prepares one feature of the CNN in correspondence with each feature point, as shown in FIG. 8. FIG. 8 is a schematic view showing feature points to be extracted.

Even the second CNN to extract feature points can accurately acquire the feature points by using weighting factors obtained by learning based on supervisory data, like the first CNN to detect a face. The second CNN to extract feature points uses learning data of only a specific variation, unlike the first CNN to detect a face position. Hence, the feature position detection accuracy of the second CNN to extract feature points is very high although it has no high detection robustness of the first CNN to detect a face.

In this embodiment, learning is performed using images with only specific variations, i.e., eye and mouth shape variations and illumination variation. However, the present invention is not limited to this. For example, learning based on images with only illumination variation may be done using images acquired by changing the illumination variation width without lowering the feature point extraction accuracy, i.e., images under various illumination environments. Leaning may be executed using images with only other specific variations such as illumination variation and size variation. A feature for a single feature point may be prepared in correspondence with each of size variation, rotational variation, and illumination variation. The number of layers, the number of features, and the connection relationship between features of the second CNN to extract feature points may be changed, like the first CNN to detect a face. The CNN to extract feature points need not always extract one feature point from one feature. Feature points of similar features such as the right eye lateral canthus (V-shape) and left eye medial canthus (V-shape) may be extracted from the same feature of the CNN.

The predetermined feature amount extraction unit 110 restricts the processing region of each feature of each layer and executes operation by using the second CNN for extracting feature points. More specifically, the predetermined feature amount extraction unit 110 decides a processing region restriction range to extract each feature point on the basis of the face position calculated by the first CNN (face position detection unit 101) for detecting a face position. The face position includes, e.g., the eye region barycentric positions 160 and 161, mouth region barycentric position 163, face region barycentric position 162, and nostril position (to be described later), as shown in FIG. 9.

(Region Restriction Processing)

Region restriction processing executed by the predetermined feature amount extraction unit 110 to extract the nostril barycentric position will be described next in detail with reference to FIG. 10. FIG. 10 is a schematic view showing a nostril barycentric position calculation range (barycenter calculation range) to obtain a nostril position, a product-sum operation range necessary for obtaining the barycenter calculation range, and an input image range necessary for obtaining the barycenter calculation range.

Referring to FIG. 10, a region 173 denotes a barycenter calculation range. As shown in FIG. 10, the barycenter calculation range 173 is a rectangular region having a horizontal range decided on the basis of a right eye detection position 170 and a left eye detection position 171. The vertical range of the barycenter calculation range 173 is decided on the basis of the right eye detection position 170 or left eye detection position 171 and a mouth detection position 172.

The barycenter calculation range 173 is used to calculate a barycentric position from obtained neuron values. To calculate a barycenter in the barycenter calculation range 173, neuron values must exist in the barycenter calculation range 173. The minimum region of input image data necessary for ensuring existence of neuron values in the barycenter calculation range 173 can be calculated by using the receptive field size to detect a nostril and the receptive field size of each feature of the first layer.

More specifically, to obtain neuron values in the nostril position barycenter calculation range 173, the feature neuron values of the first layer of a region 174 extended by ½ the receptive field size to detect a nostril are necessary. Hence, each feature of the first layer level requires the neuron values of the region 174. To obtain the neuron values of the region 174 in the first layer, the input image data of a region 175 extended by ½ the receptive field size to detect each feature of the first layer is necessary. In this way, the minimum input image data region necessary for the nostril position barycenter calculation range can be calculated. The nostril position can be calculated by executing the product-sum operation of the neuron values of the preceding layer and weighting factors and then threshold processing and barycentric position detection, as described above, in these restricted ranges.

Any one of a right nostril barycentric position 176, a left nostril barycentric position 177, the barycentric position of left and right nostrils, and a subnasal edge 178 shown in FIG. 11 may be calculated as the nostril barycentric position. FIG. 11 is a schematic view showing the left and right nostril positions and the subnasal edge.

Figure 12B:
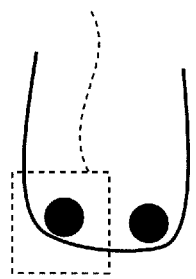

For learning, a region including the part to be set as the nostril position is set as the receptive field. Learning is done by setting the learning correct solution point to the barycentric position of the region including the part to be set as the nostril position. FIGS. 12A, 12B, and 12C are schematic views showing receptive fields necessary for calculating the barycenter of the left and right nostril positions, the barycenter of the right nostril position, and the barycenter of the subnasal edge.

For example, to calculate the barycentric position of left and right nostrils as the nostril position, a region including the left and right nostrils is set as the receptive field, as shown in FIG. 12A. Leaning is executed by setting the learning correct solution point to the barycentric position of the left and right nostrils. To calculate the right nostril barycentric position 176 as the nostril position, a region including the right nostril is set as the receptive field, as shown in FIG. 12B. Leaning is executed by setting the learning correct solution point to the right nostril barycentric position. To calculate the subnasal edge 178 as the nostril position, a region including the subnasal edge is set as the receptive field, as shown in FIG. 12C. Leaning is executed by setting the learning correct solution point to the subnasal edge barycentric position. In this embodiment, the barycentric position of left and right nostrils is calculated as the nostril position. The remaining feature points to be described below are expressed by relative positions to the nostril position.

(Feature Point Barycenter Calculation Range Setting Processing)

Processing of setting a feature point barycenter calculation range to extract feature points except the nostril feature point will be described next with reference to FIGS. 13 to 18 and 20. FIGS. 13 to 18 are views showing barycenter calculation ranges and, more specifically, barycenter calculation ranges to obtain left and right eyebrow end feature points, left and right eyebrow median feature points, left and right eye end feature points, feature points of the upper and lower edges of the left and right eyes, mouth end feature point, and feature points of the upper and lower edges of the mouth, respectively. FIG. 20 is a view showing a minimum input image region necessary for obtaining all feature points. In the following description, the distance between a right eye detection position 181 and a left eye detection position 182 will be defined as L. A horizontal position will be defined as an X-axis position, and a vertical position will be defined as a Y-axis position.

Figure 13:
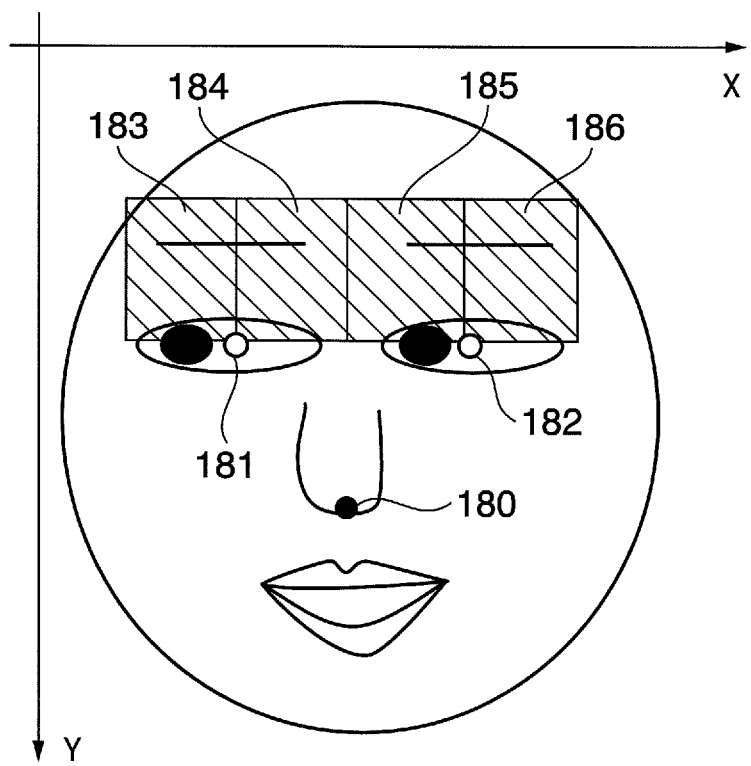
FIG. 13 is a schematic view showing a barycenter calculation range to obtain left and right eyebrow end feature points.

The barycenter calculation range to extract each feature point of left and right eyebrows will be described. Referring to FIG. 13, a region 183 to extract the feature point 140 in FIG. 8 is defined to include an X-axis region with a horizontal length from "x-coordinate of right eye detection position 181−L/2" to "x-coordinate of right eye detection position 181" and a Y-axis region with a vertical length from "y-coordinate of right eye detection position 181−L/2" to "y-coordinate of right eye detection position 181". A region 184 to extract the feature point 142 in FIG. 8 is defined to include an X-axis region with a horizontal length from "x-coordinate of right eye detection position 181" to "x-coordinate of nostril position 180" and a Y-axis region with a vertical length from "y-coordinate of right eye detection position 181−L/2" to "y-coordinate of right eye detection position 181".

Figure 14:
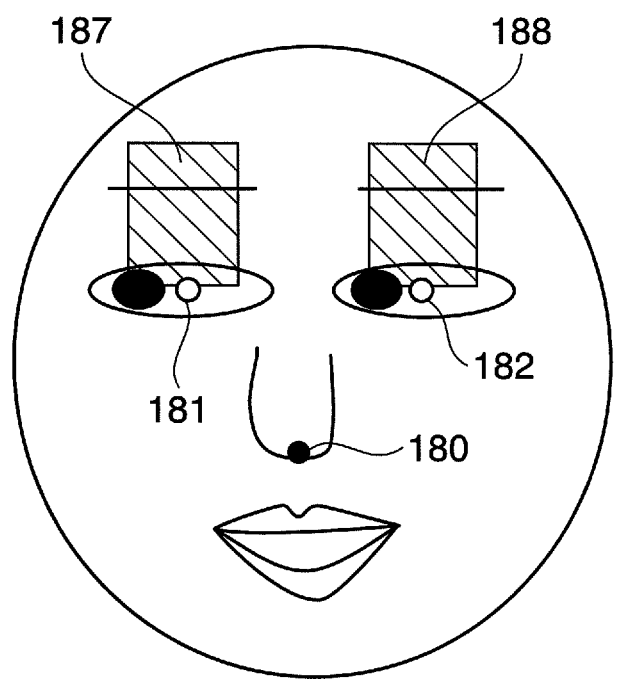
FIG. 14 is a schematic view showing a barycenter calculation range to obtain left and right eyebrow median feature points.

Referring to FIG. 14, a region 187 to extract the feature point 141 in FIG. 8 is defined to include an X-axis region with a horizontal length from "x-coordinate of right eye detection position 181−L/4" to "x-coordinate of right eye detection position 181+L/4" and a Y-axis region with a vertical length from "y-coordinate of right eye detection position 181−L/2" to "y-coordinate of right eye detection position 181". Left eyebrow feature point extraction regions 185, 186, and 188 are set like the right eyebrow feature point extraction regions 183, 184, and 187.

Figure 15:
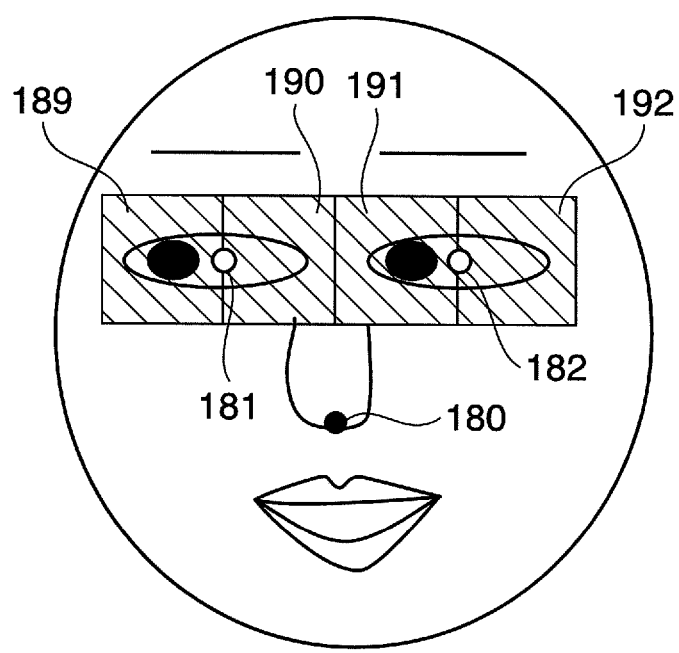
FIG. 15 is a schematic view showing a barycenter calculation range to obtain left and right eye end feature points.

The barycenter calculation range to extract each feature point of left and right eyes will be described next. Referring to FIG. 15, a region 189 to extract the feature point 146 in FIG. 8 is defined to include an X-axis region with a horizontal length from "x-coordinate of right eye detection position 181−L/2" to "x-coordinate of right eye detection position 181" and a Y-axis region with a vertical length from "y-coordinate of right eye detection position 181−L/2" to "y-coordinate of right eye detection position 181+L/2". A region 190 to extract the feature point 149 in FIG. 8 is defined to include an X-axis region with a horizontal length from "x-coordinate of right eye detection position 181" to "x-coordinate of nostril position 180" and a Y-axis region with a vertical length from "y-coordinate of right eye detection position 181−L/2" to "y-coordinate of right eye detection position 181+L/2".

Figure 16:
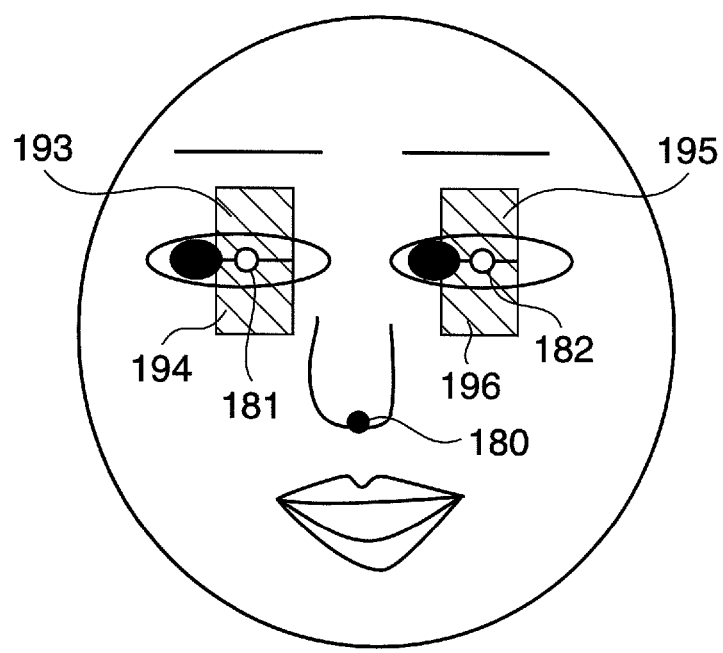
FIG. 16 is a schematic view showing a barycenter calculation range to obtain the feature points of the upper and lower edges of left and right eyes.

Referring to FIG. 16, a region 193 to extract the feature point 147 is defined to include an X-axis region with a horizontal length from "x-coordinate of right eye detection position 181−L/8" to "x-coordinate of right eye detection position 181+L/8" and a Y-axis region with a vertical length from "y-coordinate of right eye detection position 181−L/4" to "y-coordinate of right eye detection position 181". A region 194 to extract the feature point 148 in FIG. 8 is defined to include an X-axis region with a horizontal length from "x-coordinate of right eye detection position 181−L/8" to "x-coordinate of right eye detection position 181+L/8" and a Y-axis region with a vertical length from "y-coordinate of right eye detection position 181" to "y-coordinate of right eye detection position 181+L/4". Left eye feature point extraction regions 191, 192, 195, and 196 are set like the right eye feature point extraction regions 189, 190, 193, and 194.

The barycenter calculation range to extract each feature point of a mouth will be described next. The distance between the nostril position 180 and a mouth detection position 197 in FIG. 17 will be defined as $L_1$. A horizontal position will be defined as an X-axis position, and a vertical position will be defined as a Y-axis position, as in the above description.

Figure 17:
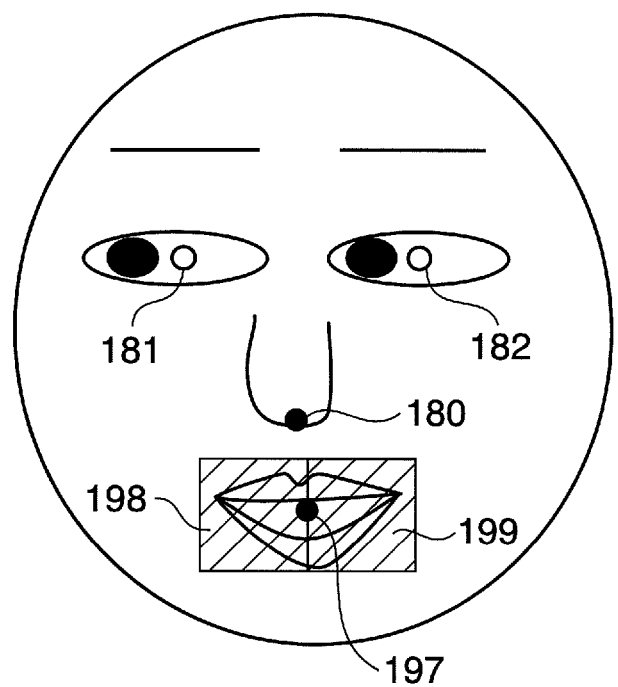
FIG. 17 is a schematic view showing a barycenter calculation range to obtain a mouth end feature point.

Referring to FIG. 17, a region 198 to extract the feature point 155 in FIG. 8 is defined to have a horizontal length from "x-coordinate of mouth detection position 197−2L/3" to "x-coordinate of mouth detection position 197" and a vertical length from "y-coordinate of mouth detection position 197−$L_1$" to "y-coordinate of mouth detection position 197+$L_1$". A region 199 to extract the feature point 158 in FIG. 8 is defined to have a horizontal length from "x-coordinate of mouth detection position 197" to "x-coordinate of mouth detection position 197+2L/3" and a vertical length from "y-coordinate of mouth detection position 197−$L_1$" to "y-coordinate of mouth detection position 197+$L_1$".

Figure 18:
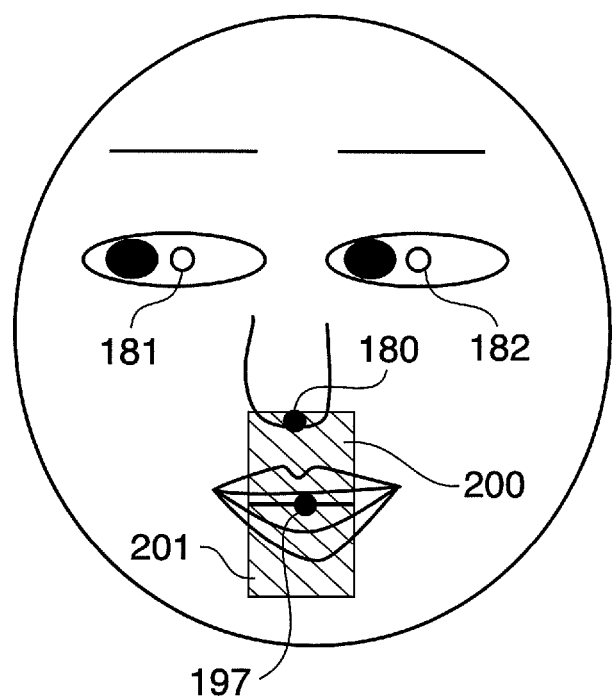
FIG. 18 is a schematic view showing a barycenter calculation range to obtain the feature points of the upper and lower edges of the mouth.

Referring to FIG. 18, a region 200 to extract the feature point 156 in FIG. 8 is defined to have a horizontal length from "x-coordinate of mouth detection position 197−L/4" to "x-coordinate of mouth detection position 197+L/4" and a vertical length from "y-coordinate of nostril position 180" to "y-coordinate of mouth detection position 197". A first layer 201 to extract the feature point 157 in FIG. 8 is defined to have a horizontal length from "x-coordinate of mouth detection position 197−L/4" to "x-coordinate of mouth detection position 197+L/4" and a vertical length from "y-coordinate of mouth detection position 197" to "y-coordinate of mouth detection position 197+$L_1$".

As described above, the predetermined feature amount extraction unit 110 decides each barycenter calculation range to extract a feature point on the basis of the image sensing target's face position detected by the face position detection unit 101. A minimum and necessary input image data region like a hatched region 210 in FIG. 20 in the input image is calculated by using the receptive field size to obtain each feature point and the receptive field size of each feature of the first layer in the above-described way. Since the regions are restricted, the processing load on the CNN in feature point extraction can be reduced.

The above-described arrangement sets regions to extract feature points on the basis of the face detection position, left and right eye detection positions, mouth detection position, and nostril position obtained by the first CNN for face detection in the current frame. However, the present invention is not limited to this. For example, the feature points may be extracted on the basis of those extracted in the preceding frame (e.g., the nostril position and feature points extracted in the preceding frame). Alternatively, the regions may be set on the basis of a plurality of positions between feature points. The present invention is not limited to the above-described region setting range.

In the above description, feature point coordinates are expressed as relative positions to the nostril detection position (feature point 154 in FIG. 8). However, the present invention is not limited to this. For example, feature point coordinates may be expressed as relative positions to the face detection position or medial canthus feature point (feature point 149 or 150 in FIG. 8).

(Feature Amounts)

Figure 19:
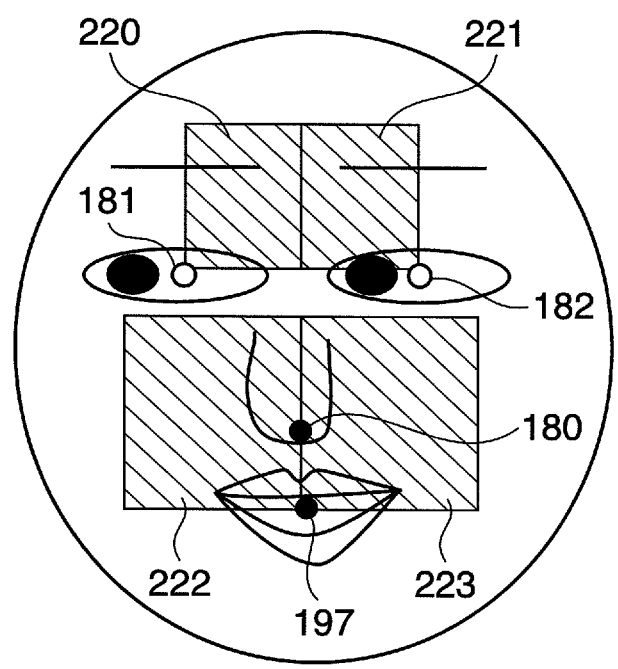
FIG. 19 is a view showing forehead, glabella, and cheek regions.

Feature amounts necessary for recognizing facial expression from obtained feature points will be described next with reference to FIGS. 8 and 19. FIG. 19 is a view showing forehead, glabella, and cheek regions.

In this embodiment, the following feature amounts are extracted and used for facial expression recognition. The feature amounts listed below are merely examples, and any other values can be used as feature amounts in accordance with the use and purpose.

The shapes of eyebrows (e.g., the angle (tilt) made by the line segment connecting the feature points 140 and 141 and the line segment connecting the feature points 141 and 142 and/or the angle (tilt) made by the line segment connecting the feature points 143 and 144 and the line segment connecting the feature points 144 and 145 in FIG. 8).

The distance between left and right eyebrows (the distance between the feature points 142 and 143 in FIG. 8).

The distances between eyebrows and eyes (the distance between the feature points 140 and 146, the distance between the feature points 141 and 147, the distance between the feature points 142 and 149, the distance between the feature points 143 and 150, the distance between the feature points 144 and 151, and the distance between the feature points 145 and 153 in FIG. 8).

The distances between eye ends and mouth ends (the distance between the feature points 146 and 155 and the distance between the feature points 153 and 158 in FIG. 8).

The distances between eye ends (the distance between the feature points 146 and 149 and the distance between the feature points 150 and 153 in FIG. 8).

The distances between the upper and lower edges of eye regions (the distance between the feature points 147 and 148 and the distance between the feature points 151 and 152 in FIG. 8).

The distance between mouth ends (the distance between the feature points 155 and 158 in FIG. 8).

The distance between the upper and lower edges of a mouth region (the distance between the feature points 156 and 157 in FIG. 8).

Wrinkles in forehead and glabella regions (the edge densities of regions 220 and 221 in FIG. 19).

Wrinkles in left and right cheek regions (the edge densities of regions 222 and 223 in FIG. 19).

The forehead and glabella region 220 in FIG. 19 is, e.g., a rectangular region including an X-axis region with a horizontal length from "x-coordinate of right eye detection position 181" to "x-coordinate of nostril position 180" and a Y-axis region with a vertical length from "y-coordinate of right eye detection position 181–2L/3" to "y-coordinate of right eye detection position 181". The distance between the right eye detection position 181 and the left eye detection position 182 is L. The cheek region 222 is, e.g., a rectangular region including an X-axis region with a horizontal length from "x-coordinate of nostril position 180–L" to "x-coordinate of nostril position 180" and a Y-axis region with a vertical length from "y-coordinate of nostril position 180–L/4" to "y-coordinate of mouth detection position 197".

An edge density can be calculated by, e.g., counting the number of pixels contained in an edge in the region on the basis of the result of edge feature extraction by the first layer of the CNN and dividing the number of pixels by the area of the region.

[Feature Amount Variation Calculation Unit 111]

The feature amount variation calculation unit 111 will be described next. The feature amount variation calculation unit 111 calculates the variation of each feature amount by calculating the ratio of each feature amount between an expressionless face image prepared in advance and the face image of the current frame. The feature amount variation calculation unit 111 also normalizes feature amount variations in accordance with size and rotational variations of the face in the image. As described above, the normalization corrects the positions of feature points on the basis of their layout in image data.

Figure 21:
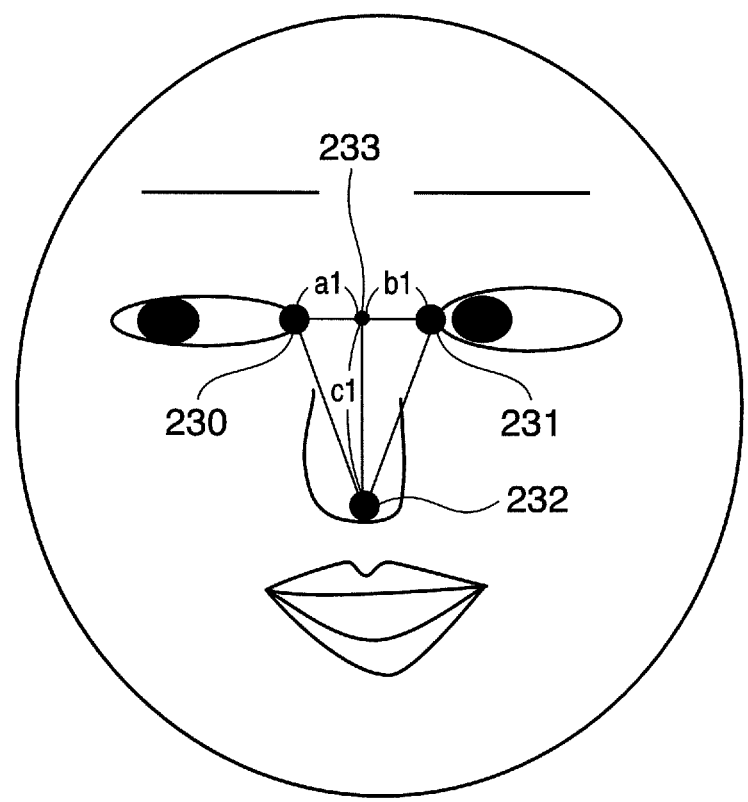
FIG. 21 is a view showing the barycentric positions of the left and right eye regions and face region used to detect size variation and rotational variation.

Variations are detected on the basis of a distance a1 between the detection position of a right medial canthus feature point 230 and a medial canthus median point 233, a distance b1 between the detection position of a left medial canthus feature point 231 and the medial canthus median point 233, and a distance c1 between the detection position of a nostril position 232 and the medial canthus median point 233, as shown in FIG. 21. The distance between the right medial canthus feature point and the medial canthus median point 233, the distance between the left medial canthus feature point and the medial canthus median point 233, and the distance between the nostril position and the medial canthus median point 233 in the expressionless face image set (prepared) in advance are represented by a, b, and c, respectively.

Figure 22:
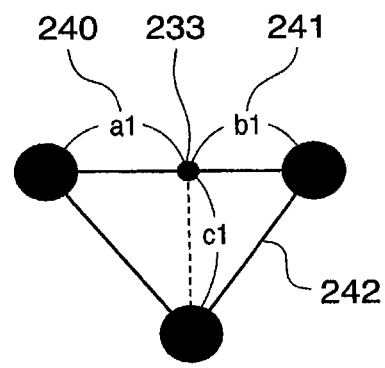
FIG. 22 is a view showing the barycentric positions of the left and right eye regions and face region when size variation has occurred.

Size variation of the face is determined by calculating the ratios of the distances a1 (240 in FIG. 22), b1 (241 in FIG. 22), and c1 (242 in FIG. 22) between the detection positions obtained from the current frame shown in FIG. 22 to the distances a, b, and c between the detection positions obtained from the preset expressionless face image. FIG. 22 is a view showing the barycentric positions of the left and right eye regions and face region when size variation has occurred. For example, when a:b:c=a1:b1:c1, and a:a1=1:2, the face size variation is twice. In this case, normalization is done by multiplying each calculated feature amount variation by ½.

Figure 23:
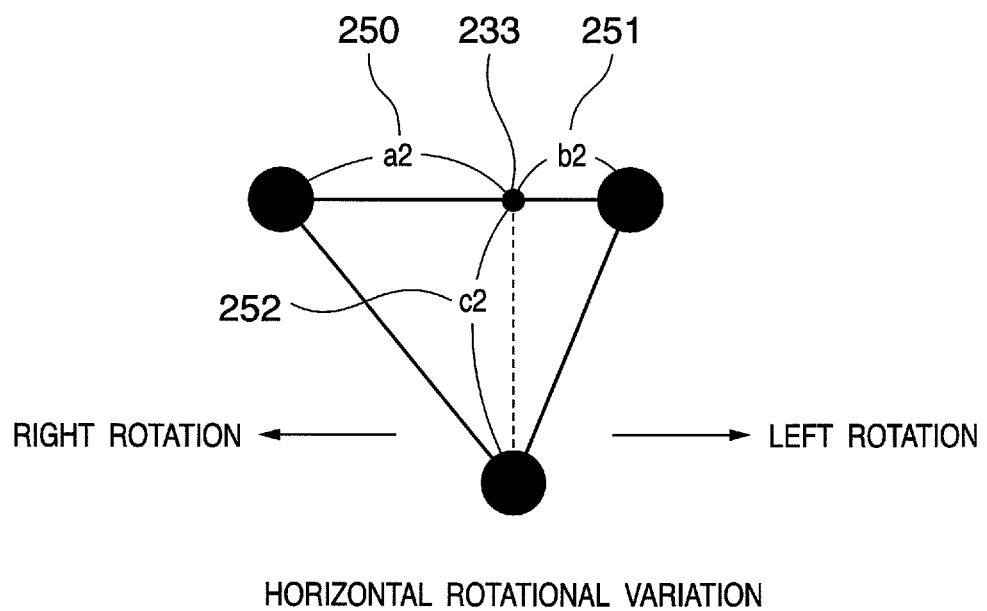
FIG. 23 is a view showing the barycentric positions of the left and right eye regions and face region when horizontal rotational variation has occurred.

Horizontal rotational variation of the face can be calculated by, e.g., comparing a2:b2 (250 and 251 in FIG. 23) in the current frame image shown in FIG. 23 with a:b in the expressionless frontal face image prepared in advance. FIG. 23 is a view showing the barycentric positions of the left and right eye regions and face region when horizontal rotational variation has occurred.

For example, consider recognition of a face turned round to the left side as shown in FIG. 23. Assume that a:b=5:5 in the expressionless frontal face image prepared in advance, and a2:b2=5:3 (250 and 251 in FIG. 23) in the current frame image. In this case, normalization can be done by multiplying horizontal feature amounts having influence on leftward rotation, i.e., the distance between the left eyebrow ends, the distance between the left eye ends, and the distance between the mouth ends by (a2/b2)/(a/b). The distance between the left eyebrow ends is, e.g., the distance between the feature points 143 and 145 in FIG. 8. The distance between the left eye ends is, e.g., the distance between the feature points 150 and 153 in FIG. 8. The distance between the mouth ends is, e.g., the distance between the feature points 155 and 158 in FIG. 8.

The eyebrow shape can be normalized by multiplying a horizontal region calculated from the feature points 143 and 144 and a horizontal region calculated from the feature points 144 and 145 by (a2/b2)/(a/b).

Vertical rotational variation of the face can be determined on the basis of the ratio of a distance c3 (262 in FIG. 24) in the face image of the current frame to the distance c in the expressionless frontal face image prepared in advance. FIG. 24 is a schematic view showing the barycentric positions of the left and right eye regions and face region when vertical rotational variation has occurred. For example, when a/a3=b/b3=1, and c:c3=2:1, the face is varied only in the vertical direction. In this case, normalization can be executed by using, as variations, values obtained by multiplying vertical feature amounts, i.e., the distances between eye ends and mouth ends, the distances between eyebrows and eyes, the distances between the upper and lower edges of eye regions, and the distance between the upper and lower edges of a mouth region by c3/c.

The distances between eye ends and mouth ends include, e.g., the distance between the feature points 146 and 155 and the distance between the feature points 153 and 158 in FIG. 8. The distances between eyebrows and eyes include, e.g., the distance between the feature points 140 and 146, the distance between the feature points 141 and 147, the distance between the feature points 142 and 149, the distance between the feature points 143 and 150, the distance between the feature points 144 and 151, and the distance between the feature points 145 and 153 in FIG. 8. The distances between the upper and lower edges of eye regions include, e.g., the distance between the feature points 147 and 148 and the distance between the feature points 151 and 152 in FIG. 8. The distance between the upper and lower edges of a mouth region includes, e.g., the distance between the feature points 156 and 157 in FIG. 8.

With the above-described arrangement, variations can be detected by using the right medial canthus feature point, left medial canthus feature point, and nostril position. Even when both rotation and size variation have occurred, feature amounts can be normalized by the same processing (using the right medial canthus feature point, left medial canthus feature point, and nostril position) as described above. The above-described normalization processing is merely an example, and the present invention is not limited to this. For example, variations may be detected by using face parts such as the right eye detection position, left eye detection position, and face detection position or other feature points, and feature amount variations may be normalized.

[Facial Expression Determination Unit 112]

Figure 25:
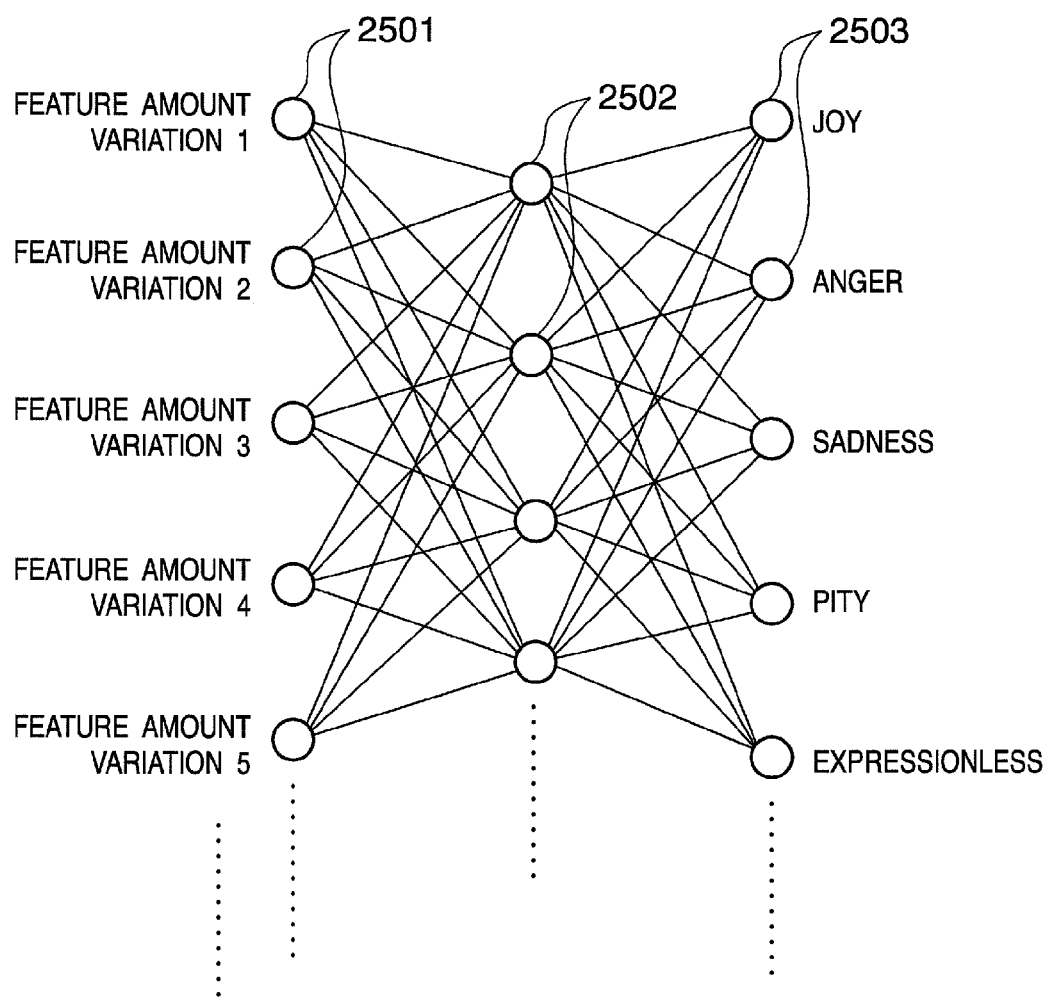
FIG. 25 is a schematic view showing the arrangement of a CNN to determine facial expression.

The facial expression determination unit 112 will be described next with reference to FIG. 25. FIG. 25 is a schematic view showing the arrangement of a CNN to determine facial expression.

The facial expression determination unit 112 executes determination by using a three-layer neural network including an input layer 2501 that receives feature amount variations normalized by the feature amount variation calculation unit 111, an intermediate layer 2502, and an output layer 2503 that outputs a facial expression determination result, as shown in FIG. 25. In the arrangement of this embodiment, one neuron is assigned to each of feature amount variations to the input layer and facial expression determination results from the output layer.

The input layer 2501 receives normalized feature amount variations. In this embodiment, the input layer 2501 receives, e.g., 22 features.

"Shapes of eyebrows" feature amount variations (4)
"Distance between left and right eyebrows" feature amount variation (1)
"Distances between eyebrows and eyes" feature amount variations (6)
"Distances between eye ends and mouth ends" feature amount variations (2)
"Distances between eye ends" feature amount variations (2)
"Distances between the upper and lower edges of eye regions" feature amount variations (2)
"Distance between mouth ends" feature amount variation (1)
"Distance between the upper and lower edges of mouth region" feature amount variation (1)
"Wrinkles in forehead and glabella regions (edge densities)" feature amount variation (1)
"Wrinkles in left and right cheek regions (edge densities) feature amount variations (2)

The intermediate layer (hidden layer) 2502 executes intermediate processing necessary for facial expression determination. In this embodiment, the intermediate layer 2502 includes 10 neurons (features).

The output layer 2503 determines facial expression on the basis of inputs from the intermediate layer 2502. In this embodiment, the output layer 2503 includes eight features (neurons) to output facial expressions "joy", "anger", "sadness", "pity", "expressionless", "worry" and "surprise".

When the recognition target face forms certain facial expression, specific feature amount variations increase/decrease. In, e.g., facial expression "joy", feature amount variations increase/decrease in the following manner as compared to an expressionless state. The variations of the distances between the eye ends and the mouth ends (between 146 and 155 and between 153 and 158 in FIG. 8) decrease. The variation of the distance between the mouth ends (between 155 and 158 in FIG. 8), the variations of the edge densities of the cheek regions (the edge densities of the regions 222 and 223 in FIG. 19), and the variations of the distances between the lateral and medial canthi (between 146 and 149 and between 150 and 153 in FIG. 8) increase.

The facial expression of the recognition target face can be determined on the basis of the types of the feature amount variations which increase or decrease and their increase/decrease amounts. In this embodiment, a threshold value is set for each feature amount variation in correspondence with each facial expression. The NN is made to learn facial expression on the basis of comparison between the threshold values and detected feature amount variations. Learning is done such that a neuron corresponding to facial expression determined on the basis of the magnitude relationship between the feature amount variations and the threshold values outputs "1". The output value range of the output layer 2503 is 0 to 1.

For example, the threshold values of the feature amount variations are set in the following way in correspondence with facial expression "joy". The feature amount variations in the expressionless state are "1".

The variations of the distances between the eye ends and the mouth ends (between 146 and 155 and between 153 and 158 in FIG. 8): 0.7

The variation (feature amount variation 2) of the distance between the mouth ends (between 155 and 158 in FIG. 8): 1.2

The variations (feature amount variation 4) of the edge densities of the cheek regions (the edge densities of the regions 222 and 223 in FIG. 19): 1.2

The variations (feature amount variation 5) of the distances between the lateral and medial canthi (between 146 and 149 and between 150 and 153 in FIG. 8): 1.1

Remaining feature amount variations: 1.0

The NN learns "joy" when the variations of the distances between the eye ends and the mouth ends are equal to or smaller than the threshold value (0.7), and the variation of the distance between the mouth ends, the variations of the edge densities of the cheek regions, and the variations of the distances between the lateral and medial canthi are equal to or larger than the threshold values (1.2, 1.2, and 1.1). That is, the NN learns to make the neuron corresponding to "joy" output a value of "1" or almost "1". The threshold values are stored in the table 113. FIG. 40 is a view showing the contents of the table 113. The facial expression determination unit 112 controls learning of neurons by looking up the table 113. The table 113 is defined in a storage device such as the HD 395 in advance.

Learning is done by giving supervisory data to the output layer 2503 of the NN in correspondence with input to the input layer. Hence, the facial expression determination unit 112 can determine facial expression by referring to the neurons that receive feature amount variations and determine facial expression at the output layer.

The arrangement of the input layer 2501, intermediate layer 2502, and output layer 2503 is not limited to the above-described arrangement. For example, a threshold value may be set in advance for the inputs to the input layer 2501 and the outputs from the output layer 2503. A value equal to or larger than the threshold value is defined as "1", and a value equal to or smaller than the threshold value is defined as "0" so that values of "0" and "1" are input or output. The facial expression to be determined is not limited to "joy". For example, "anger", "sadness", "pity", "expressionless", "worry" and "surprise" may be determined.

The output layer of the NN for facial expression determination may output a plurality of features with a strong value (i.e., a value close to the upper limit value). In this case, facial expression is determined on the basis of neuron groups that output a strong value. For example, when facial expressions "joy" and "sadness" are obtained, i.e., both the neuron corresponding to "joy" and the neuron corresponding to "sadness" output strong values, the facial expression is determined to be nearly "cry for joy". When a plurality of neurons included in the output layer 2503 output strong values, facial expression determination can be done in, e.g., the following way. A table storing the correspondence between neuron groups outputting strong values and facial expressions is prepared in a storage device such as the HD 395. Facial expression can be determined by looking up this table.

Figure 27:
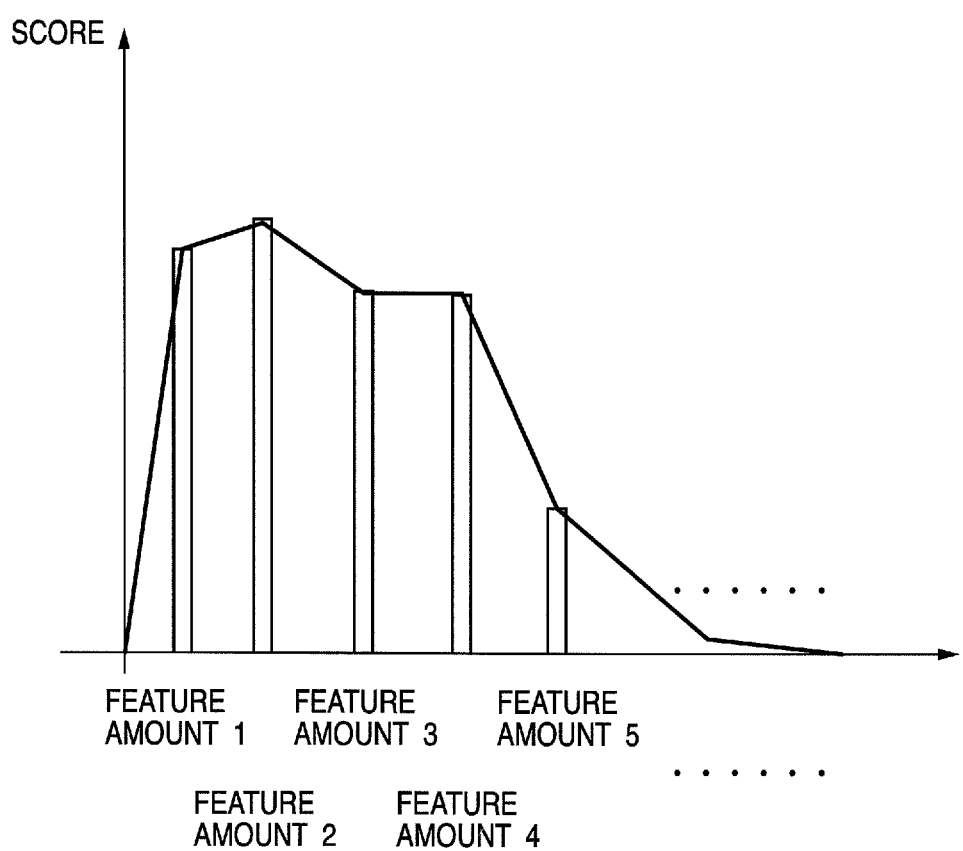
FIG. 27 is a graph showing the distribution of scores calculated from the feature amount variations.
Figure 28:
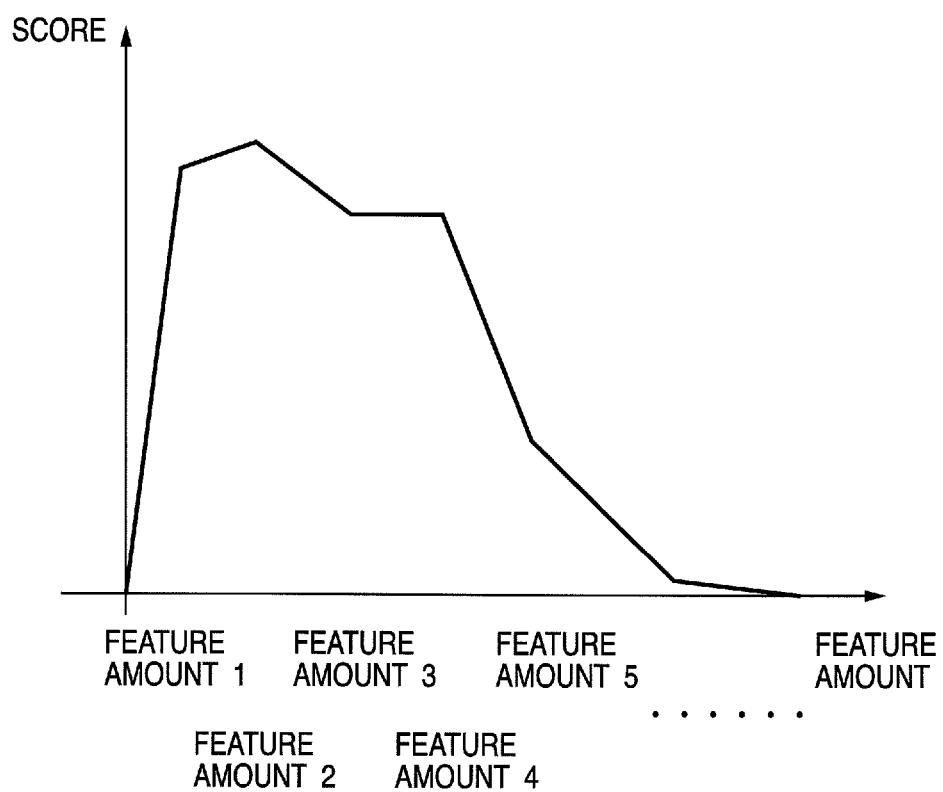
FIG. 28 is a graph showing a score distribution template prepared in advance for facial expression "joy"

In the above-described arrangement, the determination may be done after, e.g., multiplying the feature amounts by a preset weighting value. The arrangement for facial expression determination is not limited to that based on the above-described method. Facial expression determination processing based on a different method will be described with reference to FIGS. 26 to 28. FIG. 26 is a table showing the weights (weighting values) of feature amount variations in calculating scores from the feature amount variations to determine facial expression "joy". FIG. 27 is a graph showing the distribution of scores calculated from the feature amount variations. FIG. 28 is a graph showing a score distribution template prepared in advance for facial expression "joy".

First, as shown in FIG. 26, the feature amount variations are weighted in accordance with each facial expression. Scores are calculated in correspondence with the feature amounts from the calculated product of the weighting values and feature amount variations. A facial expression score distribution is created on the basis of the calculated scores. The created facial expression score distribution is compared with a score distribution template preset for each facial expression. Facial expression corresponding to a template having a similar score distribution is determined as facial expression indicated by the face as the recognition target object.

For example, a calculated score distribution to determine facial expression "joy" is assumed to be the score distribution shown in FIG. 27. A preset score distribution template similar to the score distribution in FIG. 27 is assumed to be that corresponding to facial expression "joy" in FIG. 28. In this case, facial expression is determined as "joy".

As described above, in the image sensing device according to this embodiment, the position (face position) of a specific part of a face in image data is detected on the basis of the face outline. Regions to search for feature points are set on the basis of the detected face position. The feature points are searched for not in the entire region of the image data but only in the set regions. Hence, the search operation can be done efficiently.

In the image sensing device according to this embodiment, the face position is detected by using low-resolution image data. Feature point search is executed by using high-resolution image data. Since feature points can be searched for efficiently and extracted accurately, which makes it possible to determine facial expression accurately.

In the image sensing device according to this embodiment, use of two networks (neural networks) allows to accurately extract feature points even when various kinds of variations have occurred. In addition, even a change in facial expression with very small changes in face features can be recognized by accurately extracting the feature points.

<<Second Embodiment>>

In the first embodiment, the feature amount of an expressionless reference face registered in advance is compared with the feature amount of a recognition target face. Facial expression is determined on the basis of calculated feature amount variations. However, the facial expression determination method is not limited to this. In the second embodiment, an arrangement will be described in which each frame of a measured image is analyzed, and a change in facial expression is determined on the basis of acquired motion vectors. An information processing apparatus of this embodiment has the same hardware configuration as in the first embodiment.

[Functional Arrangement of Information Processing Apparatus]

Figure 30:
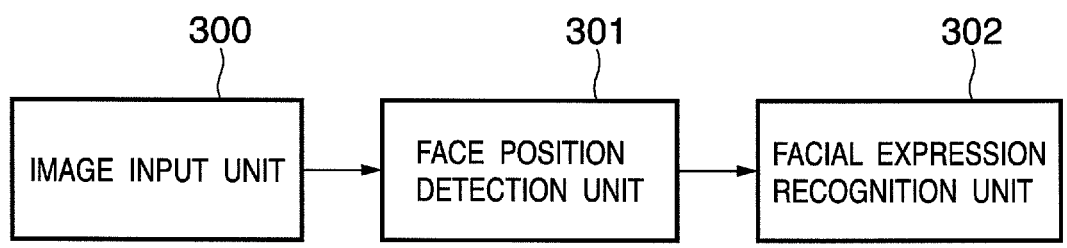
FIG. 30 is a block diagram showing the functional arrangement of an information processing apparatus according to the second embodiment.

The functional arrangement for object recognition according to this embodiment will be described first with reference to FIG. 30. FIG. 30 is a block diagram showing the functional arrangement of the information processing apparatus according to this embodiment.

As shown in FIG. 30, the functional arrangement of the information processing apparatus of this embodiment includes an image input unit 300, face position detection unit 301, and facial expression recognition unit 302. Processing in the image input unit 300 and face position detection unit 301 is the same as in the first embodiment, and a description thereof will be omitted.

Figure 31:
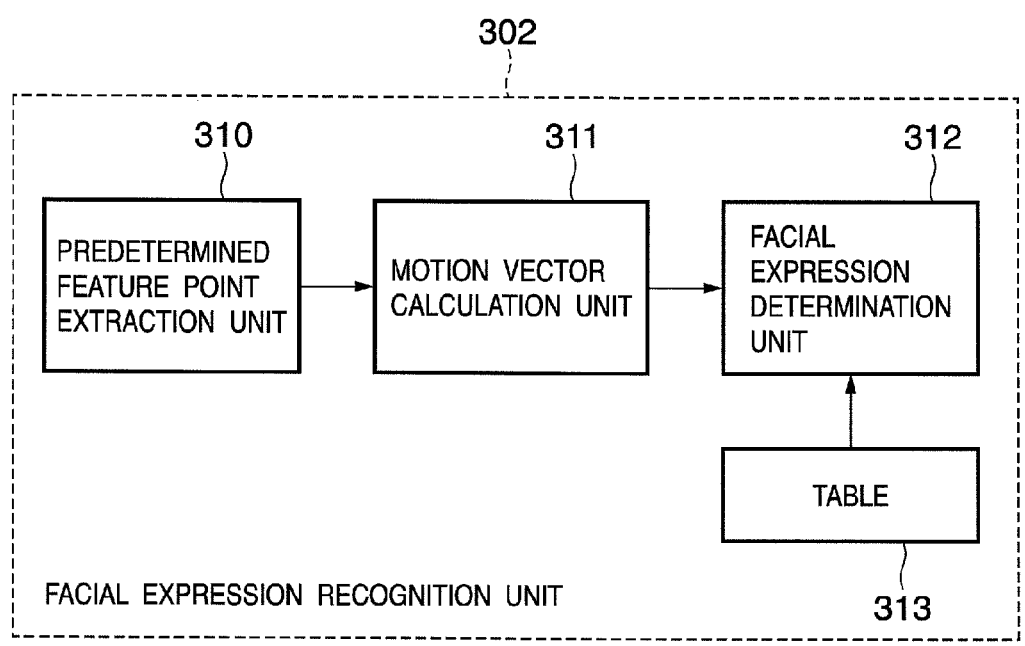
FIG. 31 is a block diagram showing the functional arrangement of a facial expression recognition unit.

FIG. 31 is a block diagram showing the functional arrangement of the facial expression recognition unit 302. In this embodiment, the facial expression recognition unit 302 comprises a predetermined feature point extraction unit 310, motion vector calculation unit 311, and facial expression determination unit 312, as shown in FIG. 31. The facial expression determination unit 312 causes neurons to learn facial expression change determination by looking up a table 313 that stores correspondence between motion vectors and facial expression changes. Processing in the predetermined feature point extraction unit 310 is the same as in the first embodiment, and a description thereof will be omitted. In this embodiment, feature point coordinates are expressed on the basis of a face detection position. However, the present invention is not limited to this.

The motion vector calculation unit 311 calculates, on the basis of the face position detected by the face position detection unit 301, motion vectors each having an initial point at the face position and an end point at a feature point. The facial expression determination unit 112 determines facial expression by using an NN, as in the first embodiment.

[Overall Processing]

Figure 36:
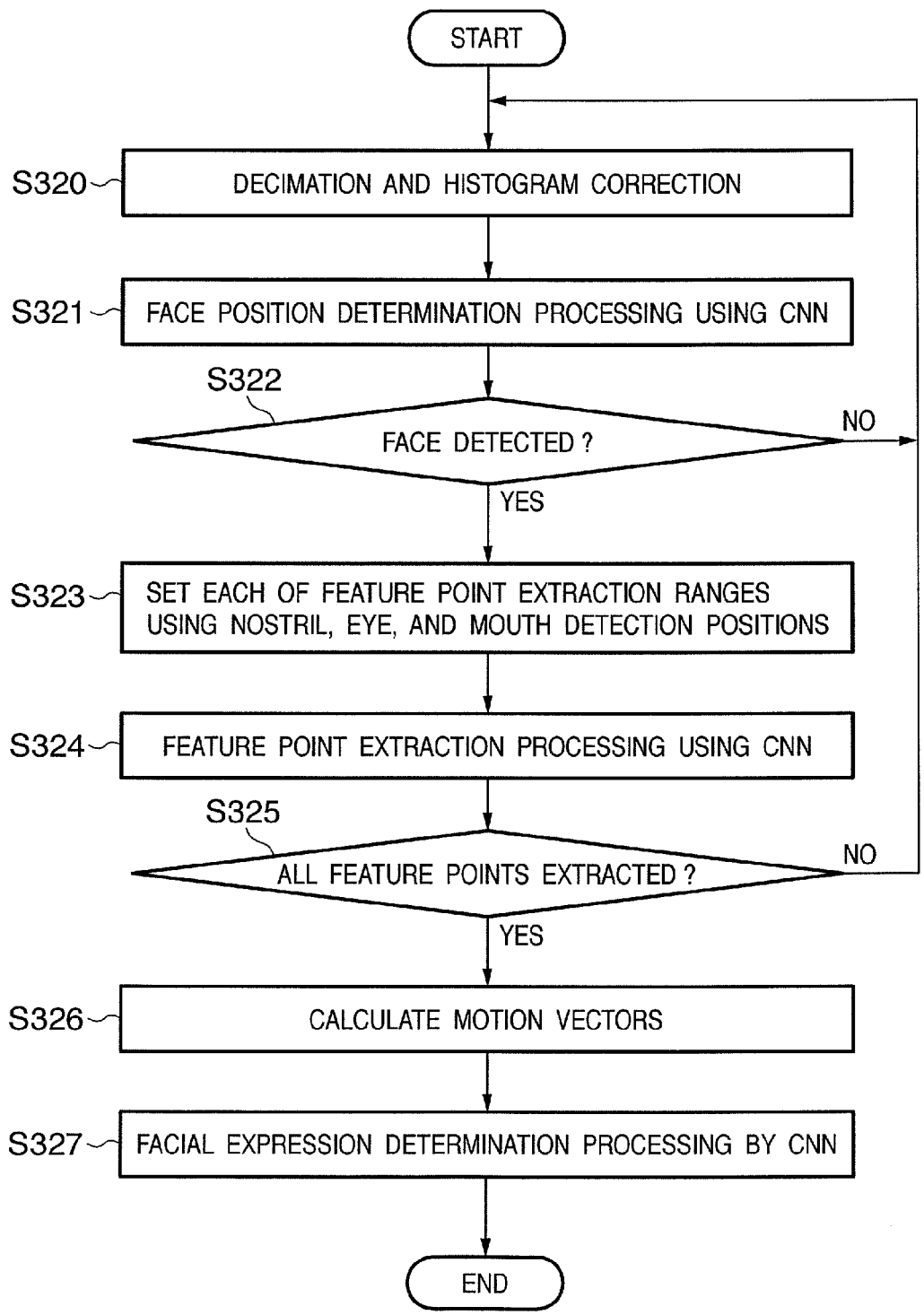
FIG. 36 is a flowchart showing the procedure of overall processing according to the second embodiment.

Overall processing executed by the arrangement of this embodiment will be described next with reference to FIG. 36. FIG. 36 is a flowchart showing the procedure of overall processing according to this embodiment.

In step S320, the face position detection unit 301 executes decimation and histogram correction of image data acquired by the image input unit 300. The image resolution after decimation is, e.g., 360×240 [pixels].

In step S321, the face position detection unit 301 determines a face position in the image by using the CNN. The resolution of the input image to the CNN to determine a face position is further reduced to, e.g., 180×120 [pixels] by decimation.

In step S322, the facial expression recognition unit 302 determines whether a face is detected. If a face is detected (YES in step S322), the process advances to step S323. If no face is detected (NO in step S322), the process returns to step S320 to execute the same processing for the image data of the next frame.

In step S323, the predetermined feature point extraction unit 310 sets a nostril feature point extraction range by using face and eye positions extracted by the first CNN for face position detection.

In step S324, the predetermined feature point extraction unit 310 extracts feature points by using the second CNN on the basis of the extraction range set in step S323. The resolution of the input image to the second CNN for feature point extraction is, e.g., 360×240 [pixels].

In step S325, the predetermined feature point extraction unit 310 determines whether all feature points are extracted by the processing in steps S323 and S324. If all feature points are extracted (YES in step S325), the process advances to step S326. If not all feature points are extracted (NO in step S325), the process returns to step S320 to execute the same processing for the next frame.

In step S326, the motion vector calculation unit 311 calculates motion vectors of the feature points by comparing vectors calculated in the preceding frame with those calculated in the current frame.

In step S327, facial expression is determined by using an NN for facial expression determination on the basis of the motion vectors calculated in step S326. The processing is complete.

Processing in each step will be described below in detail by explaining processing in each functional arrangement.

[Motion Vector Calculation Unit 311]

The function of the motion vector calculation unit 311 will be described next in detail. The motion vector calculation unit 311 calculates, on the basis of the face position detected by the face position detection unit 301, motion vectors each having an initial point at the face position and an end point at a feature point. The number of motion vectors equals the number of feature points except the nostril feature point shown in FIG. 8.

Figure 32:
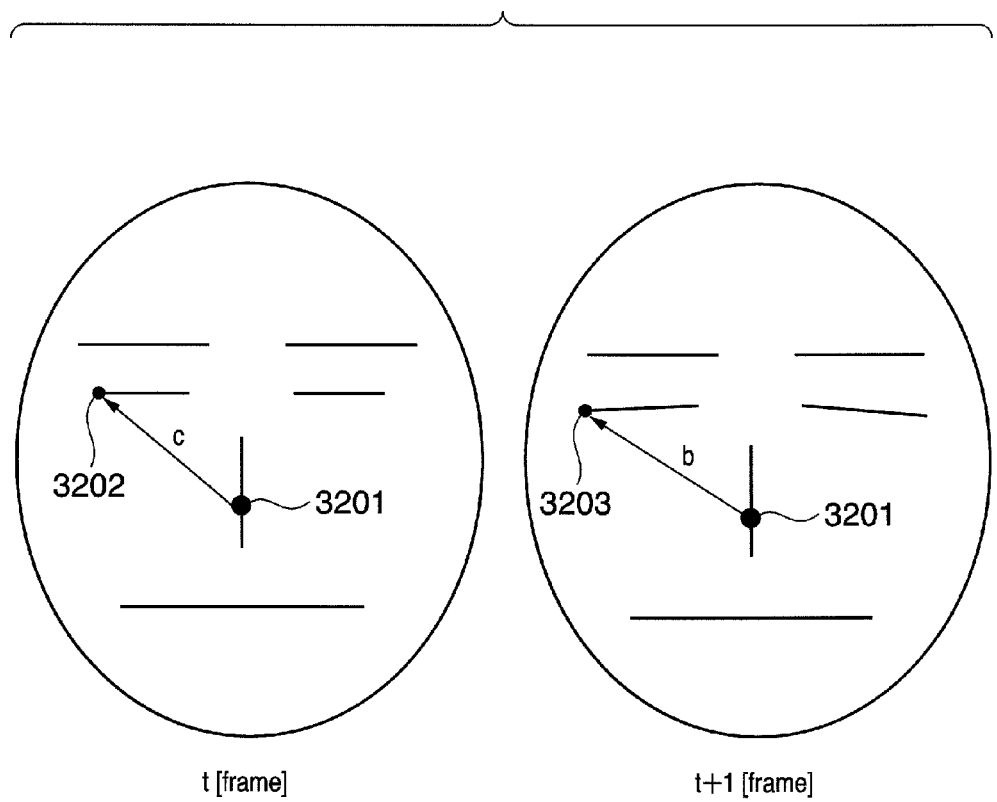
FIG. 32 is a schematic view showing a vector that has the initial point at the face detection position and the end point at the right lateral canthus feature point in t [frame] and t+1 [frame] images.

Motion vector calculation will be described with reference to FIG. 32. FIG. 32 is a schematic view showing a vector that has the initial point at the face detection position and the end point at the right lateral canthus feature point in t [frame] and t+1 [frame] images.

Referring to FIG. 32, reference numeral 3201 denote a face detection position as a reference point; 3202, a lateral canthus feature point in t [frame]; and 3203, a lateral canthus feature point in t+1 [frame]. As shown in FIG. 32, in t [frame] and t+1 [frame], vectors c and b are defined by setting the face detection position 3201 as an initial point and the lateral canthus feature points 3202 and 3203 as end points. A motion vector a is defined as $\underline{a} = \underline{b} - \underline{c}$.

Figure 33:
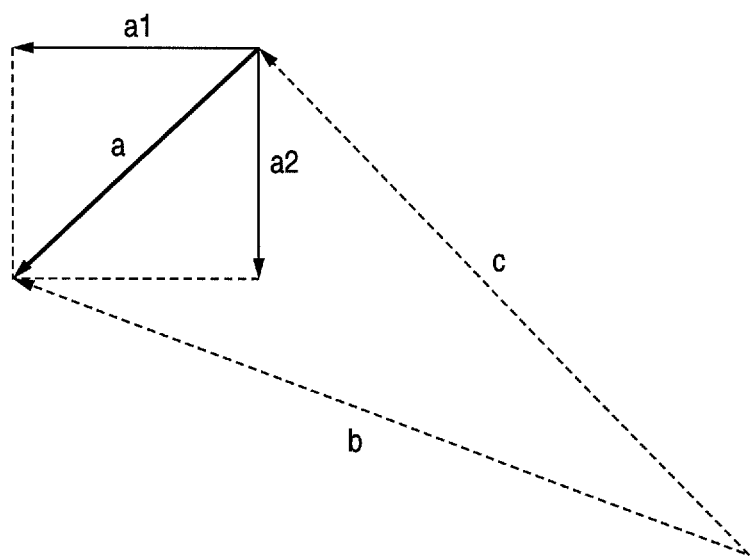
FIG. 33 is a schematic view showing calculation of a motion vector.

FIG. 33 is a schematic view showing calculation of a motion vector. Motion vectors are calculated similarly for the remaining feature points. A total of 18 motion vectors except for the nostril feature point are calculated. Instead of using t [frame] and t+1 [frame] and t+2 [frame] or t+3 [frame] may be used in accordance with the frame rate to calculate motion vectors.

The directions and sizes of the calculated motion vectors are changed by variations. Normalization is executed to cope with a size change. For example, the size of each vector is represented on the basis of an intercanthal distance |f|.

Figure 35:
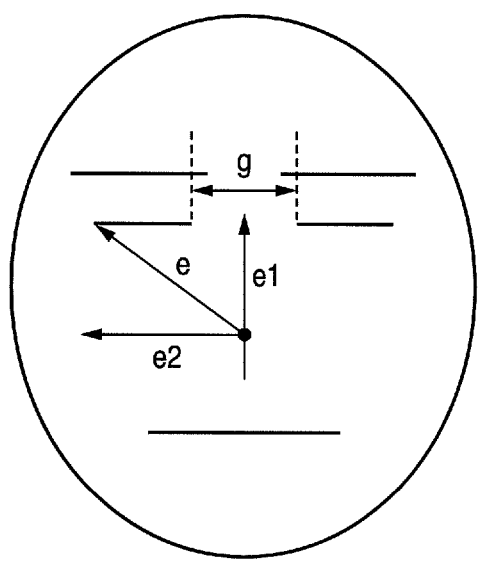
FIG. 35 is a view showing the intercanthal distance and the horizontal and vertical components of the vector that has the initial point at the face detection position and the end point at the right lateral canthus feature point when size variation has occurred.

For example, referring to FIG. 34, when a vector f is defined as the reference of normalization, a vector d can be expressed by d/|f| after normalization. If the size varies, and the intercanthal distance changes to |g|, as shown in FIG. 35, a vector e in FIG. 35 can be expressed by e/|g| after normalization. With this normalization, if only the size varies without changes in face features such as the eyes and mouth, the vector d equals the vector e. This allows to suppress recognition errors caused by the image sensing angle.

If horizontal rotational variation has occurred, only the horizontal component of the vector in FIG. 34 changes. The magnitude of a horizontal component d2 of the vector d in FIG. 34 is normalized in accordance with rotational variation. In the normalization, rotation is detected by using the face detection position and left and right eye detection positions, and feature point layout is corrected on the basis of the detected rotation, as described in the first embodiment.

For example, in FIG. 23, the horizontal component of each vector obtained from feature points in the rotational direction region is multiplied by a2/b2. As shown in FIG. 33, the motion vector a is calculated from $\underline{b} - \underline{c} = \underline{a}$. The feature points in the rotational direction region are, e.g., feature points 143, 144, 145, 150, 151, 152, 153, and 158 in FIG. 8.

Even in vertical rotational variation, the magnitude of a vertical component d1 of each of vectors obtained from all feature points except the nostril feature point is multiplied by c/c3. After that, the motion vector a is calculated from $\underline{b} - \underline{c} = \underline{a}$, as shown in FIG. 33.

The initial point of a vector calculated from feature points is not limited to the above-described face detection position. Alternatively, a nostril feature point position (feature point 154 in FIG. 8), medial canthus feature points (feature points 149 and 150 in FIG. 8), eye detection positions (right eye detection position 160 and left eye detection position 161 in FIG. 9) obtained by the face detection CNN, and mouth detection position (163 in FIG. 9) may be used.

[Facial Expression Determination Unit 312]

The facial expression determination unit 312 will be described next. The facial expression determination unit 312 determines facial expression by using NNs as in the first embodiment. In the first embodiment, 22 normalized feature amount variations obtained by comparison with an expressionless face prepared in advance in a storage device such as the HD 395 are input. In the second embodiment, for example, the horizontal and vertical components of 18 motion vectors, i.e. a total of 36 sizes and directions of vectors are input to an NN. For example, a motion vector (4,−3) can be decomposed to a horizontal component +4 and a vertical component −3. The sizes and directions of the components of vectors are input.

On the other hand, the output includes eight facial expression determination neurons that output a value from "0" to "1". The neurons of the output system are the same as those of the first embodiment. Learning of facial expression will be described. As described in the first embodiment, when the face serving as the recognition target object exhibits certain facial expression, specific feature amount variations increase/decrease. When the face serving as the recognition target object exhibits certain facial expression, motion vectors also have specific directions and sizes. For this reason, when specific directions and sizes of motion vectors representing certain facial expression are input to the features of the input layer, the neuron in the output layer, which represents this facial expression is made to output a value close to "1". Learning is thus performed.

The table 313 stores the correspondence between the parameters (e.g., values representing directions and sizes) of motion vectors and facial expressions. FIG. 41 is a view showing the contents of the table 313. The facial expression determination unit 312 controls learning of the neurons by looking up the table 313. For example, learning is controlled to increase the output level of "joy" if parameter 1 of motion vector 1 defined in advance tends to increase while parameter 2 tends to decrease. The table 113 is defined in a storage device such as an HD 395 in advance.

As described above, in the arrangement according to this embodiment, facial expression is determined on the basis of motion vectors calculated on the basis of feature points in adjacent frames. Hence, a change in facial expression can efficiently be detected.

<<Third Embodiment>>

In the first and second embodiments, the information processing apparatus is assumed to be a PC, WS, or PDA. However, the present invention is not limited to this. For example, the above-described arrangement may be implemented by an image sensing device such as a digital camera.

The arrangement of this embodiment incorporates face detection and facial expression recognition functions in an image sensing device such as a digital camera (camera) to make it possible to automatically detect that an object exhibits preset desired facial expression (e.g., "joy") and automatically record it. In addition, the recorded image is displayed.

Figure 37:
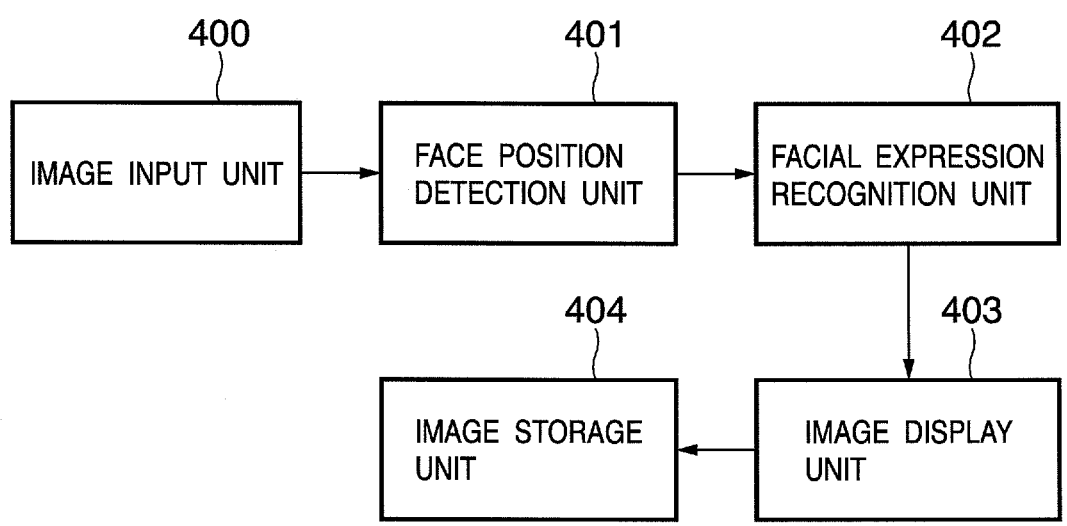
FIG. 37 is a block diagram showing the functional arrangement of an information processing apparatus according to the third embodiment.

FIG. 37 is a block diagram showing the functional arrangement of the information processing apparatus according to the third embodiment. The information processing apparatus of this embodiment comprises an image input unit 400, face position detection unit 401, facial expression recognition unit 402, image display unit 403, and image storage unit 404, as shown in FIG. 37.

The image input unit 400, face position detection unit 401, and facial expression recognition unit 402 execute the same processing as in the first and second embodiments.

The image display unit 403 displays, on a display 397, an image determined by the facial expression recognition unit 402 to have preset facial expression. That is, image data temporarily stored in a buffer memory such as a RAM 392 is displayed on the display 397. At this time, image data may be interlaced every several pixels and displayed. In this case, high-speed display is possible.

The image storage unit 404 stores the image data displayed on the display 397 in a storage device such as a RAM or memory (e.g., flash memory) 394.

[Overall Processing]

Figure 38:
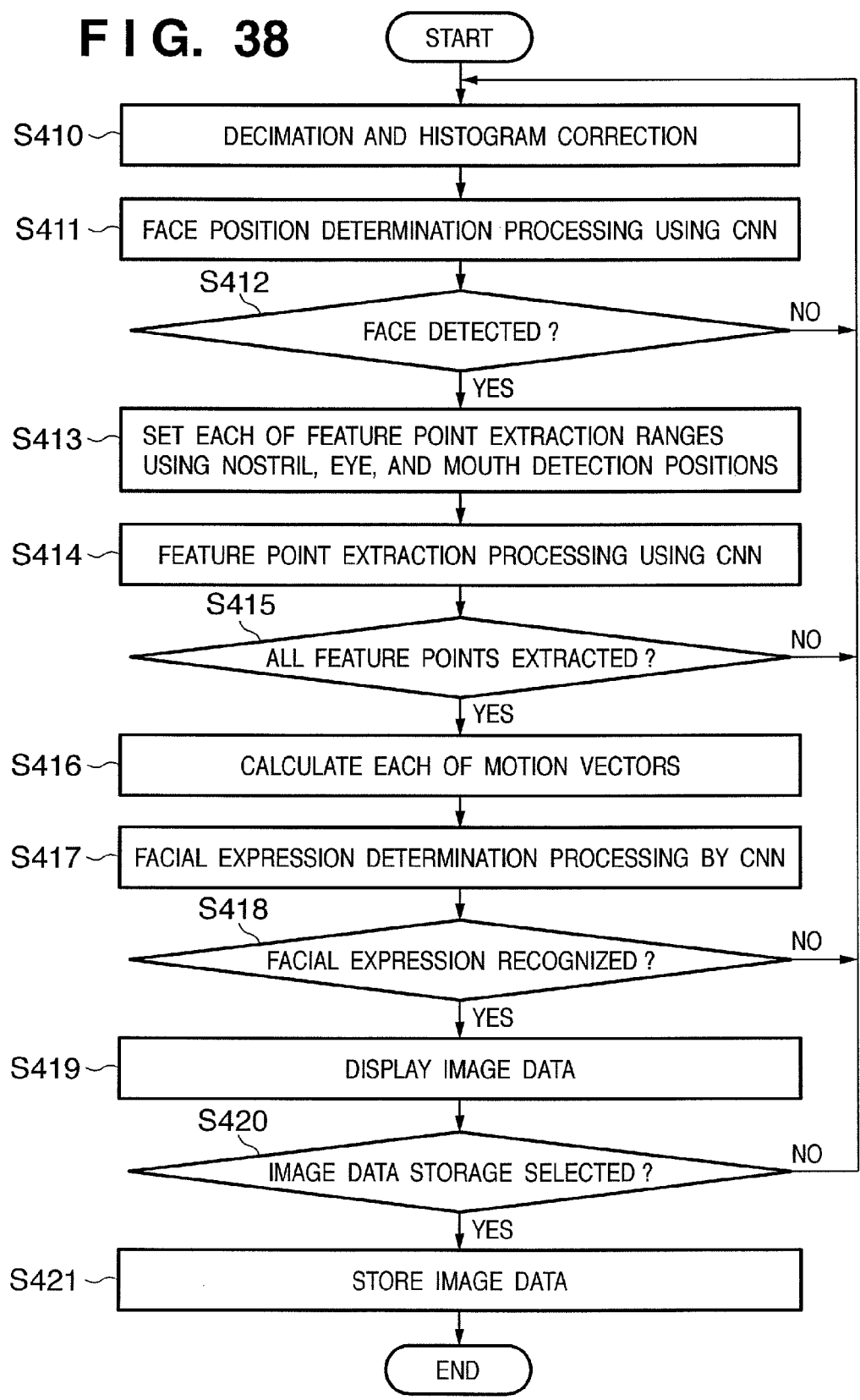
FIG. 38 is a flowchart showing the procedure of overall processing according to the third embodiment.

Overall processing executed by the arrangement of this embodiment will be described next with reference to FIG. 38. FIG. 38 is a flowchart showing the procedure of overall processing according to this embodiment.

In step S410, the face position detection unit 401 executes decimation and histogram correction of image data acquired by the image input unit 400. The image resolution after decimation is, e.g., 360×240 [pixels].

In step S411, the face position detection unit 401 determines a face position in the image by using the CNN. The resolution of the input image to the CNN to determine a face position is further reduced to, e.g., 180×120 [pixels] by decimation.

In step S412, the facial expression recognition unit 402 determines whether a face is detected. If a face is detected (YES in step S412), the process advances to step S413. If no face is detected (NO in step S412), the process returns to step S410 to execute the same processing for the image data of the next frame.

In step S413, the facial expression recognition unit 402 sets a nostril feature point extraction range by using face and eye positions extracted by the first CNN for face position detection.

In step S414, the facial expression recognition unit 402 extracts feature points by using the second CNN on the basis of the extraction range set in step S413. The resolution of the input image to the second CNN for feature point extraction is, e.g., 360×240 [pixels].

In step S415, the facial expression recognition unit 402 determines whether all feature points are extracted by the processing in steps S413 and S414. If all feature points are extracted (YES in step S415), the process advances to step S416. If not all feature points are extracted (NO in step S415), the process returns to step S410 to execute the same processing for the next frame.

In step S416, the facial expression recognition unit 402 calculates motion vectors of the feature points by comparing vectors calculated in the preceding frame with those calculated in the current frame.

In step S417, facial expression is determined by using an NN for facial expression determination on the basis of the motion vectors calculated in step S416.

In step S418, it is determined whether facial expression is recognized in step S417. If facial expression is recognized (YES in step S418), the process advances to step S419. If facial expression is not recognized (NO in step S418), the process returns to step S410 to continue the processing.

In step S419, image data with recognized facial expression is displayed on the display 397. This display is done at a lower resolution as needed. In addition to the image data, a user interface to allow the user to select whether to store the displayed image data. in a storage device such as the medium 394 is displayed on the display 397.

If the user selects storage of image data in step S420 (YES in step S420), the process advances to step S421. If storage is not selected (NO in step S420), the process returns to step S410 to continue the processing.

In step S421, the image data is stored in the medium 394 (e.g., flash memory) at a high resolution. The processing is ended.

The processing in steps S418 to S421 may be executed in accordance with, e.g., the following manner. Facial expression to be displayed on the display 397 and/or stored in a storage device such as the medium 394 is set in advance. In step S418, it is determined whether the recognition target image is recognized to have the preset facial expression. If the facial expression is recognized (YES in step S418), the process advances to step S419. If the facial expression is not recognized (NO in step S418), the process returns to step S410.

In step S419, the image data is displayed on the display 397. The process advances to step S421 while skipping step S420.

In step S421, the image data is stored in a storage device such as the medium 394.

As described above, the image sensing device according to this embodiment automatically recognizes facial expression of image data and displays and stores only image data corresponding to preset facial expression. Hence, the user can take a desired image without missing the shutter chance.

<<Other Embodiment>>

The embodiments of the present invention have been described above in detail. The present invention can take a form such as a system, apparatus, method, program, or storage medium. More specifically, the present invention is applicable to a system including a plurality of devices or an apparatus including a single device.

The present invention is also achieved even by supplying a program which implements the functions of the above-described embodiments to the system or apparatus directly or from a remote site and causing the computer of the system or apparatus to read out and execute the supplied program codes.

Hence, the program code itself, which is installed in a computer to implement the functional processing of the present invention by the computer, is also incorporated in the technical scope of the present invention. That is, the present invention also incorporates a computer program to implement the functional processing of the present invention.

In this case, the program can take any form such as an object code, a program to be executed by an interpreter, or script data to be supplied to the OS as long as the functions of the program can be obtained.

The recording medium to supply the program includes, e.g., a floppy® disk, hard disk, optical disk, magnetooptical disk, MO, CD-ROM, CD-R, CD-RW, magnetic tape, nonvolatile memory card, RON, or DVD (DVD-ROM or DVD-R).

As another program supply method, a client computer may be connected to a homepage on the Internet by using a browser in the client computer, and the computer program itself of the present invention or a compressed file containing an automatic install function may be downloaded from the homepage to a recording medium such as a hard disk. The program code contained in the program of the present invention may be divided into a plurality of files, and the files may be downloaded from different homepages. That is, a WWW server which causes a plurality of users to download a program file that causes a computer to implement the functional processing of the present invention is also incorporated in the claim of the present invention.

The following supply form is also available. The program of the present invention may be encrypted, stored in a storage medium such as a CD-ROM, and distributed to users. Any user who satisfies predetermined conditions may be allowed to download key information for decryption from a homepage through the Internet, execute the encrypted program by using the key information, and install the program in the computer. The above-described supply form is also available.

The functions of the above-described embodiments are implemented not only when the readout program is executed by the computer but also when, e.g., the OS running on the computer performs part or all of actual processing on the basis of the instructions of the program.

The functions of the above-described embodiments are also implemented when the program read out from the recording medium is written in the memory of a function expansion board inserted into the computer or a function expansion unit connected to the computer, and the CPU of the function expansion board or function expansion unit performs part or all of actual processing on the basis of the instructions of the program.

As described above, according to the embodiments, a technique of recognizing a face at a high accuracy under various image sensing conditions can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-278782, filed Sep. 26, 2005, and Japanese Patent Application No. 2005-278783, filed Sep. 26, 2005, which are hereby incorporated by reference herein in their entirety.

What is claimed is:

1. An information processing apparatus comprising:
   an input device adapted to input image data containing a face;
   a memory adapted to store the image data;
   a first detection device adapted to detect, from the image data stored in said memory, positions of a plurality of specific parts of the face, wherein said first detection device has been learned by supervisory data with various kinds of variations;
   an area setting device adapted to set respective feature point pixel extraction areas for a plurality of feature point pixels of the specific parts in the image data on the basis of the detected positions of the specific parts;
   a second detection device adapted to detect respective positions of the plurality of feature point pixels of the specific parts from the respective feature point pixel extraction areas, wherein said second detection device has been learned by supervisory data with specific variation that is one of the various kinds of variations; and
   a determination device adapted to determine facial expression of the face on the basis of the detected feature point pixels,
   wherein said second detection device has higher detection accuracy than detection accuracy of said first detection device, and said first detection device is robust to a variation in a detection target.

2. The apparatus according to claim 1, wherein said first detection device detects the position of the specific part of the face on the basis of image data with a lower resolution than image data to be processed by said second detection device.

3. The apparatus according to claim 1, further comprising a storage device adapted to store image data of the face with predetermined facial expression,
   wherein said determination device determines first facial expression on the basis one of a difference and a ratio between a first feature amount calculated by using the feature point pixel in the input image data and a second feature amount calculated by using the feature point pixel in the image data stored in said storage device.

4. The apparatus according to claim 3, wherein said determination device executes the determination after multiplying the feature amount by a preset weighting value.

5. The apparatus according to claim 1, wherein
   the input image data includes a moving image containing a plurality of frames,
   said first detection device detects the position of the specific part of the face in each of the frames,
   said second detection device detects the feature point pixel of the face in each of the frames, and
   said determination device determines a change in the facial expression of the face on the basis of a variation in the feature point pixel between frames adjacent to each other.

6. The apparatus according to claim 1, further comprising a correction device adapted to correct luminance of the input image data to enhance tone of a low-luminance region.

7. The apparatus according to claim 1, wherein the specific part is at least one of a barycenter of a face region, a barycenter of an eye region, a barycenter of a mouth region, a nostril barycentric position, a nose edge, and a barycenter of a flesh color region.

8. The apparatus according to claim 1, wherein the feature point pixel is at least one of a nostril barycenter, a barycenter of a nose edge, an end of an eyebrow, upper and lower feature point pixels of the eyebrow, a median of the eyebrow, an end of an eye, upper and lower feature point pixels of the eye, an end of a mouth, and upper and lower feature point pixels of the mouth.

9. The apparatus according to claim 1, wherein the feature point pixel is part of at least one of a shape of an eyebrow, a distance between a left eyebrow and a right eyebrow, a distance between an eyebrow and an eye, a distance between an eye end and a mouth end, a distance between a nostril barycenter and the mouth end, a distance between a nose edge and the mouth end, a distance between a barycenter of a face region and the mouth end, a distance between eye ends, a distance between upper and lower edges of an eye region, a distance between mouth ends, a distance between upper and lower edges of a mouth region, wrinkles in forehead and glabella regions, and wrinkles in left and right cheek regions.

10. The apparatus according to claim 1, wherein the feature point pixel is expressed by relative coordinates to the specific part.

11. The apparatus according to claim 1, wherein said determination device corrects a position of the feature point pixel on the basis of a layout of one of the feature point pixel and the specific part in the input image data and executes the determination on the basis of the feature point pixel with the corrected position.

12. The apparatus according to claim 1, further comprising a holding device adapted to hold the input image data when said determination device determines predetermined facial expression.

13. The apparatus according to claim 1, further comprising a display device adapted to display the input image data when said determination device determines predetermined facial expression.

14. The apparatus according to claim 1, further comprising a setting device adapted to set a region in the image data on the basis of the position of the specific part detected by said first detection device,
wherein said second detection device detects the feature point pixel of the face from the set region.

15. A control method stored in a storage medium for causing an information processing apparatus to execute processing of image data containing a face, comprising steps of:
inputting image data containing a face;
storing image data in a memory;
detecting, by a first detection device which has been learned by supervisory data with various kinds of variations, from the image data stored in the memory, positions of a plurality of specific parts of the face;
setting respective feature point pixel extraction areas for a plurality of feature point pixels of the specific parts in the image data on the basis of the detected positions of the specific parts;
detecting by a second detection device which has been learned by supervisory data with specific variation that is one of the various kinds of variations, the plurality of feature point pixels of the specific parts from the respective feature point pixel extraction areas; and
determining facial expression of the face on the basis of the detected feature point pixels,
wherein the second detection step has higher detection accuracy than detection accuracy of the first detection step, and the first detection step is robust to a variation in a detection target.

16. A non-transitory computer-readable storage medium which stores the computer program to cause a computer to function as the information processing apparatus of claim 1.

* * * * *